(12) United States Patent
Tian et al.

(10) Patent No.: US 8,361,926 B2
(45) Date of Patent: Jan. 29, 2013

(54) WATER-ABSORBING POLYSACCHARIDE AND METHOD FOR PRODUCING THE SAME

(75) Inventors: Gonglu Tian, Greensboro, NC (US); Xinyuan Yang, Greensboro, NC (US); Scott J. Smith, Greensboro, NC (US)

(73) Assignee: Evonik Stockhausen, LLC, Greensboro, NC (US)

( * ) Notice: Subject to any disclaimer, the term of this patent is extended or adjusted under 35 U.S.C. 154(b) by 297 days.

(21) Appl. No.: 12/277,637

(22) Filed: Nov. 25, 2008

(65) Prior Publication Data

US 2010/0130355 A1    May 27, 2010

(51) Int. Cl.
   B01J 20/24    (2006.01)
   B01J 20/22    (2006.01)
   B01J 20/28    (2006.01)
   B01J 20/02    (2006.01)
   B01J 20/04    (2006.01)
   B01J 20/26    (2006.01)

(52) U.S. Cl. .................. 502/404; 502/401; 502/402
(58) Field of Classification Search .................. 502/401, 502/402, 404
See application file for complete search history.

(56) References Cited

U.S. PATENT DOCUMENTS

| | | |
|---|---|---|
| 3,555,009 A | 1/1971 | Suzuki et al. |
| 3,658,790 A | 4/1972 | Bemardin |
| 4,075,279 A | 2/1978 | Holst et al. |
| 4,952,550 A | 8/1990 | Wallach et al. |
| 5,066,335 A | 11/1991 | Lane et al. |
| 5,147,135 A | 9/1992 | List et al. |
| 5,147,343 A | 9/1992 | Kellenberger |
| 5,247,072 A | 9/1993 | Ning et al. |
| 5,274,048 A | 12/1993 | Engelhardt et al. |
| 5,340,853 A | 8/1994 | Chmelir et al. |
| 5,360,903 A | 11/1994 | Lane et al. |
| 5,367,068 A | 11/1994 | Lane et al. |

(Continued)

FOREIGN PATENT DOCUMENTS

| | | |
|---|---|---|
| CA | 2460152 | 10/2009 |
| CN | 02819951 | 8/2007 |

(Continued)

OTHER PUBLICATIONS

W.M. Kulicke, Y.A. Aggour and M.Z. Elsabee, Preparation, Characterization and Rheological Behavior of Starch-Sodium Trimetaphosphate Hydrogels, Copyright 1990, pp. 134-141, Hamburg-FRG.

(Continued)

*Primary Examiner* — Daniel C McCracken
*Assistant Examiner* — Daniel Berns
(74) *Attorney, Agent, or Firm* — Smith Moore Leatherwood LLP; Philip P. McCann

(57) ABSTRACT

A process for producing a polysaccharide superabsorbent particulate including the process steps of bringing into contact a polysaccharide with a polyphosphate or a polyphosphoric acid as crosslinking agent in the presence of water to form a polysaccharide gel drying the polysaccharide gel, comminuting the dried polysaccharide gel to form polysaccharide superabsorbent polymer particles, coating the particles with a polyphosphate or polyphosphoric acid, crosslinking the coated particles, and surface treating the particulate with a metal multivalent salt or an acid. The invention further relates to a polysaccharide superabsorbent polymer particulate obtainable by this process, a water-absorbent polysaccharide, a composite, a process for producing a composite, a composite produced by this process, the use of the polysaccharide superabsorbent particulates or of the composites as well as the use of polyphosphates.

21 Claims, 5 Drawing Sheets

U.S. PATENT DOCUMENTS

| | | | |
|---|---|---|---|
| 5,415,643 | A | 5/1995 | Kolb |
| 5,451,613 | A | 9/1995 | Smith et al. |
| 5,462,972 | A * | 10/1995 | Smith et al. ............... 521/53 |
| 5,470,964 | A | 11/1995 | Qin |
| 5,550,189 | A | 8/1996 | Qin et al. |
| 5,823,674 | A | 10/1998 | Liechti et al. |
| 6,039,469 | A | 3/2000 | Palmer |
| 6,063,914 | A | 5/2000 | Wolf et al. |
| 6,387,495 | B1 | 5/2002 | Reeves et al. |
| 6,589,929 | B2 | 7/2003 | De Lima et al. |
| 6,660,211 | B2 | 12/2003 | Topolkaraev et al. |
| 6,734,298 | B1 | 5/2004 | Barbucci et al. |
| 6,906,131 | B2 | 6/2005 | Ahmed et al. |
| 7,163,969 | B2 | 1/2007 | Ahmed et al. |
| 7,169,843 | B2 | 1/2007 | Smith et al. |
| 7,173,086 | B2 | 2/2007 | Smith et al. |
| 7,241,820 | B2 | 7/2007 | Smith et al. |
| 7,291,674 | B2 | 11/2007 | Kang et al. |
| 7,312,286 | B2 | 12/2007 | Lang et al. |
| 7,335,713 | B2 | 2/2008 | Lang et al. |
| 7,399,813 | B2 | 7/2008 | Lang et al. |
| 7,427,650 | B2 | 9/2008 | Smith et al. |
| 7,482,058 | B2 | 1/2009 | Ahmed et al. |
| 7,488,541 | B2 | 2/2009 | Ahmed et al. |
| 7,579,402 | B2 | 8/2009 | Ahmed et al. |
| 7,777,093 | B2 | 8/2010 | Smith et al. |
| 7,795,345 | B2 | 9/2010 | Smith et al. |
| 7,812,082 | B2 | 10/2010 | McIntosh et al. |
| 7,816,426 | B2 | 10/2010 | Ahmed et al. |
| 7,842,386 | B2 | 11/2010 | Loeker et al. |
| 7,910,688 | B2 | 3/2011 | Tian et al. |
| 2004/0157734 | A1 | 8/2004 | Mertens |
| 2005/0288641 | A1 | 12/2005 | Soerens |
| 2008/0009616 | A1 * | 1/2008 | Frank et al. ............... 536/123.1 |
| 2008/0234420 | A1 | 9/2008 | Smith et al. |
| 2009/0065436 | A1 * | 3/2009 | Kalayci et al. ............... 210/679 |
| 2009/0134357 | A1 | 5/2009 | Bub et al. |
| 2009/0191408 | A1 | 7/2009 | Tian et al. |
| 2010/0075844 | A1 | 3/2010 | Loeker et al. |
| 2010/0099781 | A1 | 4/2010 | Tian et al. |
| 2010/0100066 | A1 | 4/2010 | Azad et al. |
| 2010/0279860 | A1 | 11/2010 | Smith et al. |
| 2010/0311578 | A1 | 12/2010 | Smith et al. |
| 2011/0009841 | A1 | 1/2011 | Ahmed et al. |
| 2011/0015601 | A1 | 1/2011 | Loeker et al. |
| 2011/0121231 | A1 | 5/2011 | Tian et al. |

FOREIGN PATENT DOCUMENTS

| | | | |
|---|---|---|---|
| DE | 1016248 | A | 9/1957 |
| DE | 1567368 | A1 | 9/1971 |
| DE | 2543187 | A1 | 3/1977 |
| DE | 4013047 | A1 | 11/1990 |
| DE | 4033007 | A1 | 4/1992 |
| DE | 19533693 | A1 | 3/1997 |
| DE | 19536944 | A1 | 4/1997 |
| DE | 19654745 | A1 | 7/1998 |
| DE | 19729272 | A1 | 1/1999 |
| EP | 0339461 | B1 | 11/1989 |
| EP | 0538904 | A1 | 4/1993 |
| EP | 0601529 | B1 | 6/1994 |
| EP | 0699793 | A1 | 3/1996 |
| EP | 0855405 | A1 | 7/1998 |
| EP | 0900807 | A | 3/1999 |
| EP | 1438354 | A1 | 7/2004 |
| KR | 10-0197827 | B | 6/1999 |
| WO | 9730090 | A1 | 8/1997 |
| WO | 9827117 | A | 6/1998 |
| WO | 0021581 | A1 | 4/2000 |
| WO | 02096953 | A1 | 12/2002 |
| WO | 03022887 | A1 | 3/2003 |
| WO | 2003025054 | A1 | 3/2003 |
| WO | 2004085481 | A1 | 10/2004 |
| WO | WO 2005123781 | * | 12/2005 |
| WO | 2006029519 | A1 | 3/2006 |

OTHER PUBLICATIONS

International Search Report completed on Nov. 16, 2005 in PCT/EP2005/006619.

Translation of the International Preliminary Report on Patentability mailed on Aug. 30, 2006 in PCT/EP2005/006619.

International Preliminary Report on Patentability, issued on May 31, 2011, in PCT/EP2009/064181.

Shi et al., U.S. Appl. No. 13/091,844, filed Apr. 21, 2011.

Tian et al., U.S. Appl. No. 12/775,984, filed May 7, 2010.

* cited by examiner

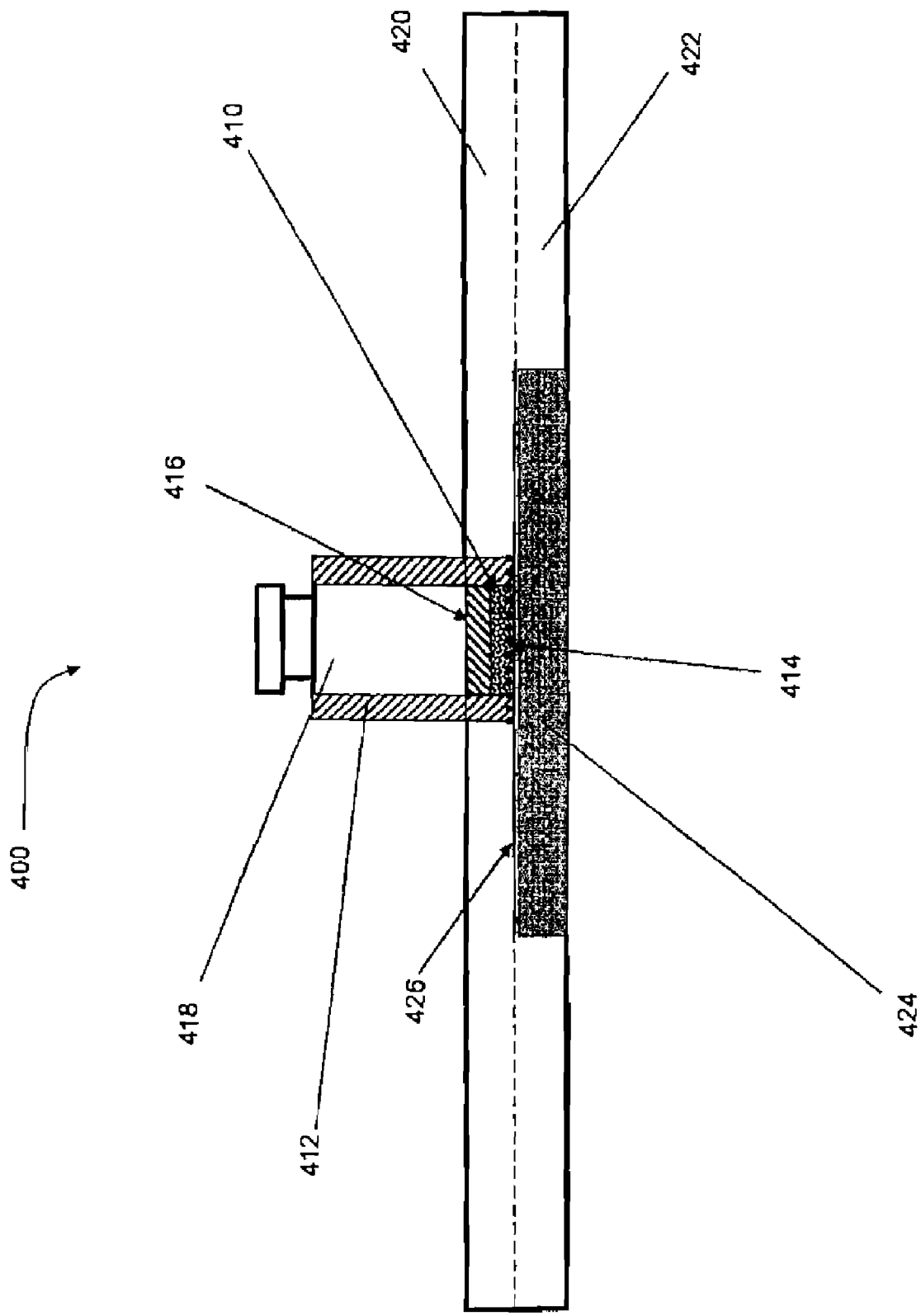

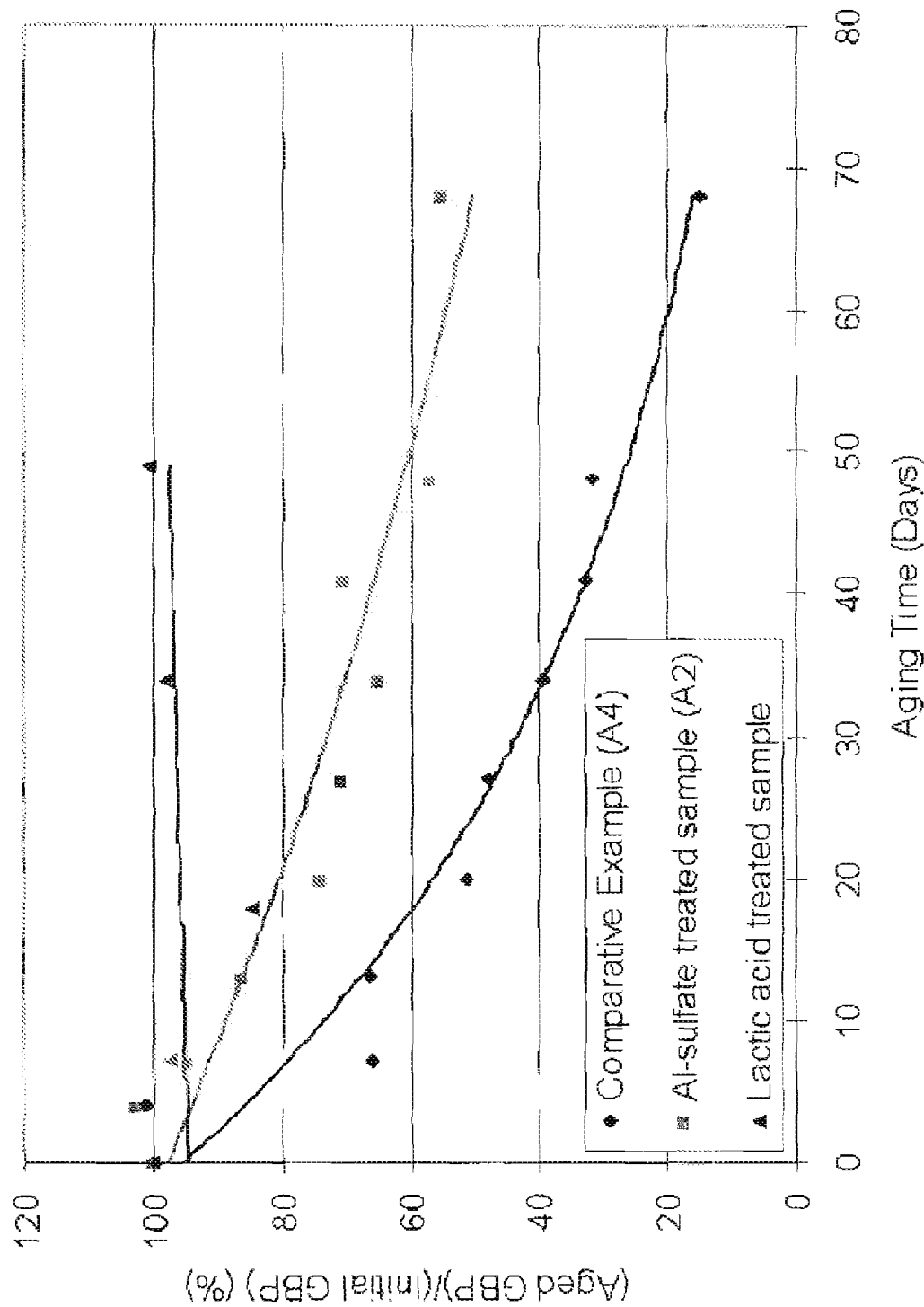

WATER-ABSORBING POLYSACCHARIDE AND METHOD FOR PRODUCING THE SAME

BACKGROUND

A superabsorbent material in general refers to a water-swellable, water-insoluble material capable of absorbing at least about 10 times its weight, and up to about 30 times or more its weight in an aqueous solution containing 0.9 weight percent sodium chloride solution in water. The present invention relates to polysaccharide superabsorbent particulate, which absorbs water, aqueous liquids, and blood, and a method to make the superabsorbent polymer and particles. The acronym SAP may be used herein, and is generally used in the industry, in place of superabsorbent polymer, superabsorbent polymer composition, superabsorbent polymer particles, or variations thereof.

A superabsorbent polymer generally is a cross linked, partially neutralized polymer that is capable of absorbing large amounts of aqueous liquids and body fluids, such as urine or blood, with swelling and the formation of hydrogels, and of retaining them under a certain pressure in accordance with the general definition of superabsorbent material. A superabsorbent polymer composition is a superabsorbent polymer that has been surface treated that may include surface cross linking, surface treatment, and other treatment. Commercially available superabsorbent polymer compositions generally include cross linked polyacrylic acids or cross linked starch-acrylic acid graft polymers wherein some of the carboxyl groups are neutralized with sodium hydroxide solution or potassium hydroxide solution. Superabsorbent polymer composition particles are particles of superabsorbent polymers or superabsorbent polymer compositions, and generally have a particle size of from about 150 microns to about 850 microns. A comprehensive survey of superabsorbent polymers, and their use and manufacture, is given in F. L. Buchholz and A. T. Graham (editors) in "Modern Superabsorbent Polymer Technology," Wiley-VCH, New York, 1998.

A primary use of SAP and SAP particles is in sanitary articles, such as baby's diapers, incontinence products, or sanitary towels. For fit, comfort, and aesthetic reasons, and from environmental aspects, there is an increasing trend to make sanitary articles smaller and thinner. This is being accomplished by reducing the content of the high volume fluff fiber in these articles. To ensure a constant total retention capacity of body fluids in the sanitary articles, more SAP content is being used in these sanitary articles.

Most of the superabsorbent materials used today are primarily based upon slightly crosslinked synthetic polymers. These include, for example, polymers, and co-polymers based upon acrylic acid or acrylamide, which are not based upon renewable materials and are insufficiently or not at all biologically degradable.

The present invention generally relates to a process for producing a polysaccharide superabsorbent polymer particulate, a polysaccharide superabsorbent polymer particulate obtainable by this process, or the use of the polysaccharide superabsorbent polymer particulate. Numerous water-absorbing polymers are described in the literature that are based upon polysaccharides, and that are at least partially biodegradable. The raw materials for the production of superabsorbent polymers based upon polysaccharides are, however, frequently water-soluble and must be converted into the water-insoluble form, in order to be able to use them as superabsorbers for hygiene applications.

EP 0 538 904 A1 and U.S. Pat. No. 5,247,072 describe superabsorbers based upon carboxyalkylpolysaccharides. In the process, the carboxyalkylpolysaccharide is dissolved in water and isolated by drying or precipitation and then thermally crosslinked via internal ester bridges by the reaction of the hydroxyl groups of the polysaccharide skeleton with the acidic carboxyl groups. Since this crosslinking reaction is very sensitive to small changes of the pH value, the temperature or the reaction duration, absorbers with widely varying absorption properties are obtained. The materials are characterized by a high absorption capacity under pressure, which, however, falls to a fraction of the original absorption properties within a few weeks, upon storage of the absorber.

U.S. Pat. No. 5,550,189 describes superabsorbent polymers based upon carboxyalkylpolysaccharides, in which the aging stability is improved by addition of multifunctional crosslinkers, such as, e.g. aluminum salts or citric acid. The production of the absorbers occurs from a common, homogeneous aqueous solution of carboxyalkylpolysaccharide and crosslinker, in which the components are present in low concentration, isolated together, and then thermally crosslinked. The synthesis of these absorbers requires a high energy and time consumption, since the aqueous solutions are only of very low concentration. The improvement of the aging stability in the many exemplary embodiments does not correspond to the demands relevant in practice.

One aspect of the present invention is to overcome the disadvantages arising from the state of the art. It is a goal of the present invention to provide biodegradable superabsorbent polymers based upon renewable raw materials, which do not have the above described deficiencies. Such superabsorbent polymers should have a high long-term storage stability, in which the absorption properties remain as far as possible. At the same time it is intended that the absorber particles have a high mechanical stability, in order to avoid the formation of fine dust parts during processing processes such as, for example, sieving or conveying.

A further aspect of the invention finds a production process for such superabsorbent polymer, which is simple, economical and may be reliably carried out, delivers a uniform product quality, and in which small quantities of solvents are used and organic solvents are avoided if possible. Furthermore, it should be possible to carry out the process without the use of toxicologically questionable substances.

SUMMARY

The foregoing aspects of the invention may be achieved by a process for producing a water-absorbing polysaccharide superabsorbent polymer comprising the process steps of: mixing a polysaccharide with a polyphosphate or with polyphosphoric acid as crosslinking agent in the presence of water to form a polysaccharide gel, drying the polysaccharide gel, comminuting the polysaccharide gel into polysaccharide superabsorbent polymer particles, coating the polysaccharide superabsorbent polymer particles with a polyphosphate or polyphosphoric acid as an crosslinking agent, crosslinking the coated polysaccharide superabsorbent polymer particles, and surface treating the dried polysaccharide superabsorbent polymer particles with a treatment selected from multivalent metal salt or an acid.

In addition, the present invention is directed to a polysaccharide superabsorbent polymer particulate having a permeability half life of about 30 days. Furthermore, the present invention is directed to absorbent articles including the polysaccharide superabsorbent polymer particulate of the present invention.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects, and advantages of the present invention will become better understood with regard to the following description, appended claims, and accompanying drawings where:

FIG. 4 is a side view of the test apparatus employed for the Absorbency Under Load Test; and FIG. 5 is a plot of the percentage of remained GBP vs. aging time of superabsorbent polymers from the Permeability Half-life Test.

DEFINITIONS

Figure 1:
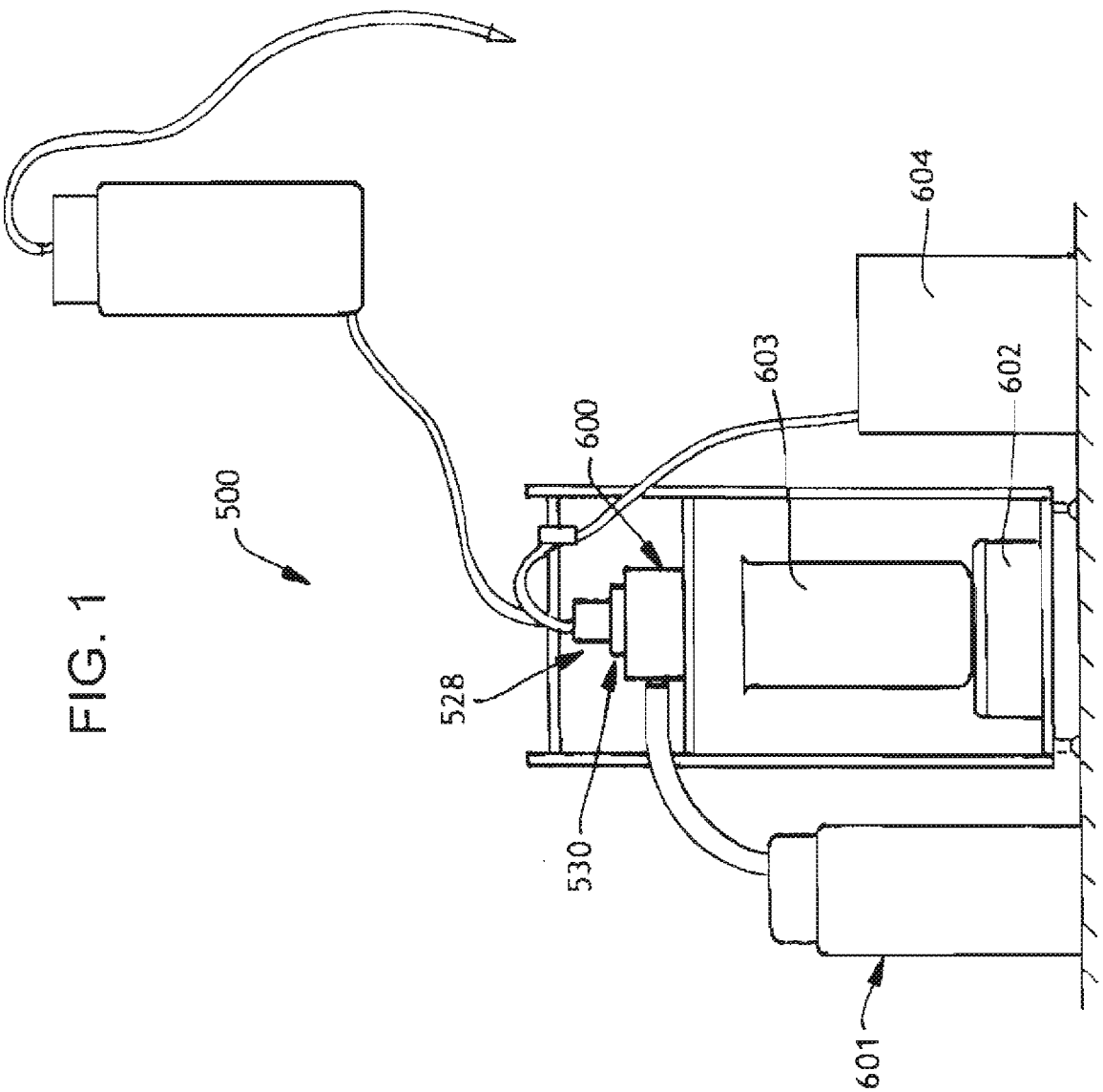
FIG. 1 is a side view of the test apparatus employed for the Free Swell Gel Bed Permeability Test.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The term "absorbent article" generally refers to devices that may absorb and contain fluids. For example, personal care absorbent articles refer to devices that are placed against or near the skin to absorb and contain the various fluids discharged from the body.

The term "cross linked" used in reference to the superabsorbent polymer refers to any means for effectively rendering normally water-soluble materials substantially water-insoluble but swellable. Such a cross linking means may include, for example, physical entanglement, crystalline domains, covalent bonds, ionic complexes and associations, hydrophilic associations such as hydrogen bonding, hydrophobic associations, or Van der Waals forces.

The term "Darcy" is a CGS unit of permeability. One Darcy is the permeability of a solid through which one cubic centimeter of fluid, having a viscosity of one centipoise, will flow in one second through a section one centimeter thick and one square centimeter in cross-section, if the pressure difference between the two sides of the solid is one atmosphere. It turns out that permeability has the same units as area; since there is no SI unit of permeability, square meters are used. One Darcy is equal to about $0.98692 \times 10^{-12}$ $m^2$ or about $0.98692 \times 10^{-8}$ $cm^2$.

The term "disposable" is used herein to describe absorbent articles that are not intended to be laundered or otherwise restored or reused as an absorbent article after a single use. Examples of such disposable absorbent articles include, but are not limited to, personal care absorbent articles, health/medical absorbent articles, and household/industrial absorbent articles.

The term "dry superabsorbent polymer composition" generally refers to the superabsorbent polymer composition having less than about 10% moisture.

The term "mass median particle size" of a given sample of particles of superabsorbent polymer composition is defined as the particle size, which divides the sample in half on a mass basis, i.e., half of the sample by weight has a particle size greater than the mass median particle size, and half of the sample by mass has a particle size less than the mass median particle size. Thus, for example, the mass median particle size of a sample of superabsorbent polymer composition particles is 2 microns if one-half of the sample by weight is measured as more than 2 microns.

The term "acid" generally refers to a compound with acidic properties and are generally weak acids and do not dissociate completely in water, and have low molecular weights such as phosphoric acid, acetic acid, lactic acid, citric acid, glycolic acid, and gluconic acid as examples.

The terms "particle," "particulate," and the like, when used with the term "superabsorbent polymer," refer to the form of discrete units. The units may comprise flakes, fibers, agglomerates, granules, powders, spheres, pulverized materials, or the like, as well as combinations thereof. The particles may have any desired shape: for example, cubic, rod-like, polyhedral, spherical or semi-spherical, rounded or semi-rounded, angular, irregular, et cetera. Shapes having a high aspect ratio, like needles, flakes, and fibers, are also contemplated for inclusion herein. The terms "particle" or "particulate" may also include an agglomeration comprising more than one individual particle, particulate, or the like. Additionally, a particle, particulate, or any desired agglomeration thereof may be composed of more than one type of material.

The term "permeability half-life" of a superabsorbent polymer composition is defined as the time required for the gel bed permeability to decrease to half of its initial value. The permeability half-life is determined under controlled test conditions according to the herein-described test method.

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

The term "polyolefin" as used herein generally includes, but is not limited to, materials such as polyethylene, polypropylene, polyisobutylene, polystyrene, ethylene vinyl acetate copolymer, and the like, the homopolymers, copolymers, terpolymers, etc., thereof, and blends and modifications thereof. The term "polyolefin" shall include all possible structures thereof, which include, but are not limited to, isotatic, synodiotactic, and random symmetries. Copolymers include atactic and block copolymers.

The term "superabsorbent materials" refers to water-swellable, water-insoluble organic or inorganic materials including superabsorbent polymers and superabsorbent polymer compositions capable, under the most favorable conditions, of absorbing at least about 10 times their weight, or at least about 15 times their weight, or at least about 25 times their weight in an aqueous solution containing 0.9 weight percent sodium chloride.

The term "superabsorbent polymer composition" refers to a superabsorbent polymer comprising a surface additive in accordance with the present invention.

The terms "superabsorbent polymer" and "superabsorbent polymer preproduct" refer to a material that is produced by conducting all of the steps for making a superabsorbent polymer as described herein, up to and including drying the material, and coarse grinding in a crusher.

The term "surface cross linking" means that the level of functional cross links in the vicinity of the surface of the superabsorbent polymer particle generally is higher than the level of functional cross links in the interior of the superabsorbent polymer particle. As used herein, "surface" describes the outer-facing boundaries of the particle. For porous superabsorbent polymer particles, exposed internal surface also are included in the definition of surface.

The term "thermoplastic" describes a material that softens when exposed to heat and which substantially returns to a non-softened condition when cooled to room temperature.

The term "% by weight" or "% wt" when used herein and referring to components of the superabsorbent polymer composition, is to be interpreted as based on the weight of the dry superabsorbent polymer composition, unless otherwise specified herein.

These terms may be defined with additional language in the remaining portions of the specification.

DETAILED DESCRIPTION

The foregoing aspects of the invention may be achieved by a process for producing a water-absorbing polysaccharide superabsorbent polymer comprising the process steps of: mixing a polysaccharide with a polyphosphate or with polyphosphoric acid as crosslinking agent in the presence of water to form a polysaccharide gel; drying the polysaccharide gel; communiting the polysaccharide gel into polysaccharide superabsorbent polymer particles; coating the polysaccharide superabsorbent polymer particles with a polyphosphate or polyphosphoric acid as an crosslinking agent; crosslinking the coated polysaccharide superabsorbent polymer particles; and surface treating the dried polysaccharide superabsorbent polymer particles with a treatment selected from multivalent metal salt or acid.

The polysaccharides used in the process according to the invention may be water-soluble, or water-swellable, and may be used in non-crosslinked form. They may be modified with further groups besides the hydroxyl groups, in particular with such groups that improve the water solubility. Such groups include, for example, the carboxyl group, the carboxylalkyl group, such as the carboxymethyl group, the hydroxyalkyl group, the hydroxymethyl group, and/or the hydroxyethyl group, such as the hydroxymethyl group, as well as the phosphate group.

Depending upon the functional modification, the polysaccharides used in the process according to the invention may be based upon electrically charged, or upon electrically uncharged polysaccharides. A use of a polysaccharide mixture based upon electrically charged and electrically uncharged polysaccharide may be used. Starches or starch derivatives, such as, hydroxypropyl starches, amylose, amylopectin, cellulose or cellulose derivatives, for example, ethyl hydroxylethylcellulose, or hydroxylpropylcellulose, or polygalactomannanes such as guar or carob seed flour belong to the electrically uncharged polysaccharides according to the invention.

The electrically charged polysaccharides according to the invention may include polycarboxypolysaccharides, which may be derived either from polysaccharides which do not naturally comprise any carboxyl groups, and are provided with carboxyl groups by subsequent modification, or they may already comprise naturally carboxyl groups, and are optionally subsequently provided with further carboxyl groups by modification. The first group of polysaccharides may include, for example, oxidized starches, carboxylated phosphate starches, oxidized cellulose, carboxymethylcellulose, or carboxymethyl starches, such as carboxymethylcellulose (CMC). The polysaccharides, which already comprise naturally carboxyl groups, may include, for example, xanthane, alginate, or gum Arabic.

According to another embodiment of the invention, polycarboxypolysaccharides such as, for example, carboxymethyl guar, carboxylated hydroxyethyl, or hydroxypropyl cellulose, carboxymethyl cellulose and carboxymethyl starches, oxidized starches, xanthane and mixtures of the individual polycarboxypolysaccharides may be used as polysaccharide, such as carboxymethyl cellulose. Polycarboxypolysacccharide derivatives with low and high degrees of carboxyl substitution may be used in the process according to the invention. They may have an average degree of carboxyl substitution within the range from about 0.3 to about 1.5, such as polycarboxypolysaccharide derivatives with a degree of substitution of from about 0.4 to about 1.2.

In another embodiment of the process according to the invention, the polycarboxypolysaccharides may be used with an addition of carboxyl groups-free polysaccharides. Strongly swelling polysaccharides, such as, for example, polygalactomanine or hydroxyalkyl celluloses may be employed. The quantities of carboxyl groups-free polysaccharides to be used for modification may be determined by the required property profile, such as about 20 wt %, or about 10 wt %, or about 5 wt % may be used, based upon the uncrosslinked polycarboxypolysaccharide.

The carboxyl groups-free polysaccharides may be mixed with an uncrosslinked polycarboxypolysaccharide before the bringing into contact with the polyphosphate or the polyphosphoric acid or mixed with the polycarboxypolysaccharide after the bringing into contact of the uncrosslinked polycarboxypolysaccharide with the polyphosphate or the polyphosphoric acid. In another embodiment, the carboxyl groups-free polysaccharides may be initially brought into contact with the polyphosphate, or the polyphosphoric acid, or with an aqueous solution comprising the polyphosphate or the polyphosphoric acid, and the thus-obtained mixture is then mixed with the polycarboxypolysaccharide.

Examples of polyphosphate or polyphosphoric acid include chain polyphosphates (catena-phosphates), or ring polyphosphates (cyclophosphates, also described as "metaphosphates"), wherein the polyphosphates are the salts and the esters of Polyphosphoric acids. Polyphosphates may be compounds of the composition $M^I_{n+2}[P_nO_{3n+1}]$ or $M^I_n[H_2P_nO_{3n+1}]$, such as compounds of the structure $M^I_n[H_2P_nO_{3n+1}]$. Among these, compounds of the composition $Na_nH_2PO_{3n+1}$ may be used, such as for example the "Grahamsche salt", the "Maddrellsche salt", the "Kurrolsche salt" or "Calgon" used in washing agents. In another aspect of the invention, metaphosphates may be compounds of the composition $M^I_n[PO_3]_n$. In the above cited formula, $M^I$ stands for monovalent metal, such as for sodium or potassium. n may have a value of at least 2, or at least about 10, or at least about 50, wherein a value of about 5,000, or about 1,000, or about 100 should not be exceeded.

In another embodiment of the process according to the invention, polyphosphates may be used which may be prepared by condensation of dihydrogen monophosphates and in which the H atoms of the acidic groups bound as chain groups are not replaced by metal. The polyphosphates may have a composition $M^I_n[H_2P_nO_{3n+1}]$, wherein $M^I$ and n have the above detailed meaning. Polyphosphoric acids may be obtained by the controlled addition of water to $P_4O_{10}$ or by condensation during heating of $H_3PO_4$. The polyphosphoric acids according to the invention may have the composition $H_{n+2}P_nO_{3n+1}$ or $(HPO_3)_n$, whereby polyphosphoric acids of the composition $(HPO_3)_n$ are also described as metaphosphoric acids, whereby n has a value of at least about 2, or at least about 10, or at least about 20, or at least about 50, wherein a value of about 10,000, or of about 1,000, or of about 100 should not be exceeded. With increasing value of n, the above-mentioned composition of $H_{n+2}P_nO_{3n+1}$ approaches the composition $(HPO_3)_n$ of the metaphosphoric acids.

According to an embodiment of the invention, a polyphosphate or polyphosphoric acid is brought into contact, or mixed, with the uncrosslinked polysaccharide, in a quantity of from about 0.001 to about 20 wt %, such as in a quantity of from about 0.01 to about 10 wt %, or of from about 0.05 to about 5 wt %, respectively based upon the weight of the uncrosslinked polysaccharide.

The carboxyl groups of the uncrosslinked polycarboxypolysaccharides used in the process according to the invention may be neutralized to at least about 50 mol %, or to at least about 80 mol %, or to at least about 90 mol %, or to 100 mol %. Neutralization agents may include, but are not limited to alkali hydroxides such as sodium or potassium hydroxide, sodium or potassium carbonates, or hydrocarbonates or ammonium hydroxide, and amines.

The water-soluble polysaccharides used in the process according to the invention may have a high average molecular weight in the scope of the molecular weight distribution given by the natural polymer construction and thereby also a high solution viscosity in dilute aqueous solution such as, e.g. carboxymethylcellulose prepared from cotton lint. Polysaccharides with a solution viscosity in one percent aqueous solution of more than about 2,000 mPas may be utilized. A polycarboxypolysaccharide used in the process according to the invention may have a solution viscosity in one percent aqueous solution of more than about 5,000 mPas, or more than about 7,000 mPas.

Because of the production process, polysaccharides may comprise varyingly high salt amounts as side components. Typical salt contents of carboxymethylcelluloses utilized as polysaccharides according to the present invention may be about 0.5 wt % for food qualities, or about 2 wt % in technical qualities or from about 25 to about 50 wt % for products in applications as protective colloids. Although the water-absorbing polysaccharides obtained by the process according to the invention may have a high tolerance with respect to salt load, the uncrosslinked polysaccharides may have a salt quantity of not more than about 20 wt %, or not more than about 15 wt %, or not more than about 5 wt %, or not more than about 2 wt % salt, respectively based upon the weight of the uncrosslinked polysaccharide used in the process according to the invention.

The polysaccharides of the present invention may be used in the form of powders, fine powders, granulates, fibers, flakes, beads, or compacts, wherein the use of powdery materials with a particle size of from about 1 to about 2,000 μm may be used.

During the production of the polysaccharide gel in the first process step of the process according to the invention, the polysaccharide content in the mixture of polysaccharide, water, and polyphosphate or polyphosphoric acid may vary within wide limits, of from about 5 to about 65 wt %, or from about 10 to about 50 wt %, or from about 15 to about 30 wt %.

According to another embodiment of the invention, the polyphosphate or the polyphosphoric acid may be brought into contact with the uncrosslinked polysaccharide in the presence of water at a temperature of from about 15 to about 60° C., or from about 18 to about 40° C., or from about 20 to about 30° C. In a further aspect of the invention, the bringing into contact of the polyphosphate or the polyphosphoric acid with the polysaccharide may occur at room temperature, which generally refers to from about 22° C. to about 28° C.

The above mentioned polyphosphates or polyphosphoric acids may be used alone or in combination with other crosslinkers that are not based upon polyphosphates or polyphosphoric acids for crosslinking of the polysaccharide. Additional crosslinkers, such as those cited in WO 02/096953 A1 as covalent ionic or post crosslinking agents, as well as those crosslinkers which are cited in WO 00/21581 A1 on page 6 in the first paragraph may be utilized. The weight proportions between these other crosslinkers that are not based upon polyphosphate or polyphosphoric acids, and the polyphosphates or polyphosphoric acids may be from about 1:0.01 to about 1:50, or from about 1:0.1 to about 1:20, or from about 1:1 to about 1:10.

The swelling time of the crosslinked polysaccharide may depend upon the temperature at which the polyphosphate or the polyphosphoric acid is brought into contact with the uncrosslinked polysaccharide as well as from the starting compounds employed and may be easily determined by simple pre-experiments. In one aspect of the invention, the first process step of the process according to the invention is then finished when no further volume increase of the polysaccharides as a result of the swelling is observed. In another aspect, the bringing into contact of the polyphosphate or the polyphosphoric acid with the uncrosslinked polysaccharide occurs for a time period of about 1 minute to about 48 hours, or from about 1 hour to about 24 hours, or from about 12 hours to about 20 hours.

In another embodiment of the invention, mixing the uncrosslinked polysaccharide with the polyphosphate, or with the polyphosphoric acid, may occur at a pH value of from about 7 to about 13, or from about 7.5 to about 12.5, or from about 8 to about 12. This may be the case if a polycarboxypolysaccharide is used as polysaccharide. By adjusting the pH value within the above given pH ranges, a partial neutralization of the carboxyl groups present in the polysaccharide may occur. In addition, the polyphosphoric acid may be at least partially neutralized.

In another embodiment of the process according to the invention, the mixing of the uncrosslinked polysaccharide with the polyphosphate or the polyphosphoric acid may occur in such a way that initially the polyphosphate, or the polyphosphoric acid, is dissolved or dispersed in water, in the aqueous solution or the aqueous dispersion of the polyphosphate or the polyphosphoric acid. A pH value is adjusted within a range from about 7 to about 13, such as from about 7.5 to about 12.5, and such as from about 8 to about 12, and then the aqueous solution or the aqueous dispersion of the polyphosphate or the polyphosphoric acid is mixed with an uncrosslinked polysaccharide.

In another embodiment of the process according to the invention, the mixing of the uncrosslinked polysaccharide with the polyphosphate or the polyphosphoric acid may occur in such a way that the uncrosslinked polysaccharide is initially mixed with the polyphosphate or the polyphosphoric acid under dry conditions, and the thus-obtained mixture is then brought into contact with water. In this way, by addition of acids or bases to the water or to the mixture of the polycarboxypolysaccharide and the polyphosphate or the polyphosphoric acid, it is assured that the bringing into contact of the uncrosslinked polysaccharide with the polyphosphate or the polyphosphoric acid occurs at a pH value of from about 7 to about 13, or from about 7.5 to about 12.5, or from about 8 to about 12.

In another embodiment of the process according to the invention, the mixing of the uncrosslinked polysaccharide with the polyphosphate or the polyphosphoric acid may occur in such a way that initially the uncrosslinked polysaccharide may be brought into contact with water, and then the swollen polysaccharide is brought into contact with the polyphosphate or the polyphosphoric acid. It is also thus assured that, by addition of acids or bases to the water or to the polysaccharide that has been brought into contact with the water, or to the polyphosphate, or the polyphosphoric acid respectively, that the bringing into contact with the uncrosslinked polysaccharide with the polyphosphate or the polyphosphoric acid occurs at a pH value of from about 7 to about 13, or from about 7.5 to about 12.5, or from about 8 to about 12.

In another embodiment of the present invention, the mixing of the uncrosslinked polysaccharide with the polyphosphate or the polyphosphoric acid may occur in the presence of an additive, whereby the additive may be previously combined with the uncrosslinked polysaccharide or with the polyphosphate, or the polyphosphoric acid, or added to the uncrosslinked polysaccharide that has already been brought into contact with the polyphosphate or the polyphosphoric acid. If the bringing into contact of the uncrosslinked polysaccharide with the polyphosphate, or the polyphosphoric acid, occurs in such a way that initially an aqueous solution or an aqueous dispersion of the polyphosphate, or the polyphosphoric acid is prepared, which is then added to the polysaccharide, then the additive may also be added to the aqueous solution or the aqueous dispersion of the polyphosphate or the polyphosphoric acid.

In another aspect of the invention, there is a temperature difference between the temperatures of the mixing for homogenization and of the drying, or crosslinking. The temperature difference may differ by at least about 10° C., or by at least about 20° C., or by at least about 40° C., or by at least about 80° C. In another embodiment of the process according to the invention, the temperature during the mixing for homogenization lies from about 2° C. to about 40° C., or from about 10° C. to about 35° C., or from about 15° C. to about 30° C. To adjust these temperatures, the temperature of the kneader may be controlled. Either the housing surrounding the kneading shaft(s) or the kneading shafts, or both, may be temperature-controlled.

In another embodiment of the process according to the invention, a further process step may follow the drying step, or the milling step respectively, in which the particulate, crosslinked polysaccharide is surface treated or post-crosslinked in the outer part of the particle with a post-crosslinking agent. As outer part of the particle is understood, each volume element of the particle whose distance to the center of the particle may be at least about 75%, such as at least about 85%, and such as at least about 95% of the outer radius of the polymer particle.

The surface crosslinking of the dried, particulate, crosslinked polycarboxypolysaccharide may occur with about 0.001 to about 25 wt %, such as with about 0.1 to about 20 wt % of the post-crosslinking agent, respectively based upon the weight of the crosslinked polysaccharide. The post-crosslinking agent may be used in the form of about 0.01 to about 80 wt %, such as an about 0.1 to about 60 wt % solution. The addition of the post-crosslinking agent occurs in suitable mixing aggregates. These are, for example, Patterson-Kelly-mixer, Drais turbulence mixer, Lodige mixer, Ruberg mixer, worm mixer, plate mixer, fluidized bed mixer or Schugi mixer. After spraying on the solution of the post-crosslinking agent, a temperature treatment step may follow, such as in a downstream drier, at a temperature from about 40 and about 250° C., such as from about 60 to about 200° C., and such as from about 80 to about 160° C. over a time period of about 5 minutes to about 6 hours, such as about 10 minutes to about two hours, and such as about 10 minutes to about 1 hour, whereby solvent parts are removed. The optimal duration of the post-heating may be easily determined for individual crosslinker types with a small number of experiments. It is limited by the fact that the desired property profile of the superabsorber may be destroyed again as a result of heat damage. The thermal treatment may be carried out in conventional driers or ovens, for example rotary kiln ovens, fluidized bed driers, plate driers, paddle driers or infrared driers.

The aqueous solution of the surface post-crosslinker may be adjusted before its use to a temperature of about 15° C. to about 100° C., such as about 20° C. to about 60° C. The covalent surface post-crosslinking may optionally be accelerated by catalysts. Compounds that catalyze the esterification reaction between a carboxyl group and a hydroxyl group, such as, for example, hypophosphite, acetyl acetonate mineral acids may be used as catalysts, such as e.g. sulphuric acid and Lewis acids. In one aspect, sulphuric acid and hypophosphite are used. The weight ratio of surface post-crosslinker to crosslinking catalyst is about 1:0.001 to about 1:1, such as about 1:0.1 to about 2:1. In one embodiment the crosslinking catalysts are mixed with the solution of the surface post-crosslinker.

A surface treatment or post-crosslinking agent may include a water soluble multivalent metal salt or an acid. Examples of metal cations include the cations of Al, Fe, Zr, Mg, and Zn. The metal cation may have a valence of at least +3, such as Al. Examples of anions in the multivalent metal salt include halides, chlorohydrates, sulfates, nitrates and acetates. Aluminum sulfate is a multivalent metal salt that may be used and is readily commercially available. Forms of aluminum sulfate include hydrated aluminum sulfate, such as aluminum sulfate having from about 12 to about 14 waters of hydration. Mixtures of multivalent metal salts may be employed. An acid may be selected from phosphoric acid, acetic acid, lactic acid, citric acid, glyconic acid, and gluconic acid The polymer and multivalent metal salt or acid may suitably be mixed by dry blending, or in solution, using means well known to those skilled in the art. Aqueous solutions are preferred. With dry blending, a binder may be employed in an amount which sufficient to ensure that a substantially uniform mixture of the salt and the superabsorbent polymer is maintained. The binder may be water or a nonvolatile organic compound having a boiling point of at least 150° C. Examples of binders include water, polyols such as propylene glycol, glycerin and poly(ethylene glycol).

A surface treating solution may optionally comprise up to about 70 wt. % of one or more additives. Additives are, above all, water-soluble compounds, which lead to the homogeneous distribution of the crosslinker solution on the surface of the absorber, in that they slow down the penetration of the solvent into the interior of the superabsorber particle as well as reducing the solubility of the particle surface and thereby the tendency of the moist superabsorber particles to stick together. Exemplary additives may include water-miscible organic solvents such as, for example, ethanol, propanol, 2-propanol, acetone, glycerine, tetrahydrofuran and dioxane, also water-soluble hydrophilic organic solids, in particular polymers such as, e.g. polyalkylene glycols, polyvinyl alcohols, such as polyethylene glycols.

The surface additives may be added in a quantity of from about 0.01 to about 20 wt %, or from about 0.1 to about 10 wt %, or from about 1 to about 5 wt %, respectively based upon the weight of the uncrosslinked polysaccharide. In one aspect, the additives are anti blocking additives, which improve the processability of the hydrogel produced and which remain at least partially in the product after drying. In another aspect, anti blocking additives are native or synthetic fiber materials or other materials with a large surface area, e.g. from the group of silica gels and synthetic silicic acids and water-insoluble mineral salts.

Further exemplary additives are water-soluble additives from the group of bases salts and blowing agents. Blowing agents may be selected from inorganic or organic compounds that liberate gas under the influence of catalysts or heat, for example azo and diazo compounds, carbonates salts, ammonium salts, or urea. Further additives may include pH regulators such as e.g. alkali metal hydroxides, ammonia, basic salts such as e.g. alkali metal carbonates or acetates. Further additives may include neutral salts, such as, e.g. alkali metal or alkaline earth metal sulfates or chlorides for regulation of the ionic strength of the solution or of the salt content of the powdery absorber resin. Furthermore, water-miscible organic solvents, for example boiling less than about 100° C. may be used as an additive in the aqueous hydrogel. During the following drying, these volatile organic solvents substantially escape from the hydrogel. These solvents are then finally volatilized during the subsequent surface post-crosslinking.

Mixing the uncrosslinked polysaccharide with the polyphosphate or the polyphosphoric acid in the presence of water may occur continuously or discontinuously. Suitable mixing devices are e.g. discontinuous kneaders such as VAT kneaders, interior mixers or continuous kneaders such as one-, two- or multishaft mixers.

In another embodiment of the invention, respectively the water, the aqueous solution or aqueous dispersion of the polyphosphate or the polyphosphoric acid may be continuously added to the dry raw material polysaccharide, for example in an extruder, whereby the process is carried out in such a way that the water is present as minority component. The mixture of polysaccharide, polyphosphate or polyphosphoric acid and water may additionally comprise up to about 30 wt %, or up to about 20 wt % of one or more organic solvents which are miscible with water and immiscible with the polysaccharide. However, mixing the uncrosslinked polysaccharide with the polyphosphate or with the polyphosphoric acid may occur in the absence of an organic solvent.

The swollen gel may be comminuted before the crosslinking. Through the gel comminution, above all the ratio of gel surface to gel volume is increased, whereby the following drying step requires substantially less energy input. The process of gel comminution does not underlie any restriction. In one embodiment, the gel comminution may occur by pressing the gel through a breaker plate into gel strands, which may optionally be fragmented into shorter gel strands by a cutting apparatus. The gel consistency may be purposely adjusted via the type and the amount of the addition of polyphosphates or polyphosphoric acids.

In the second step of the process according to the invention, the polysaccharide gel or the comminuted polysaccharide gel may be crosslinked to form a crosslinked polysaccharide and may be dried at the same time to low residual water content. It is also conceivable to first crosslink the polysaccharide gel under conditions that do not lead to a drying of the polysaccharide gel and only then to dry the crosslinked polysaccharide gel. The crosslinking step may follow directly from the pre-swelling, but it is also possible to store the polysaccharide gels or the comminuted polysaccharide gels before further processing, for a longer period of time, e.g. several weeks, without the properties of the there from-resulting superabsorber according to the invention changing.

In another embodiment of the invention, the polysaccharide gel may be crosslinked, and dried, at the same time and at a temperature of greater than about 70° C., or greater than about 100° C., or greater than about 115° C., whereby a crosslinking or drying temperature respectively of about 300° C., or about 250° C., or about 200° C. is not exceeded. It is also conceivable to first dry the polysaccharide gel at lower temperatures than about 70° C., such as under reduced pressure, and only then to heat by increasing the dried polysaccharide to a temperature that enables a crosslinking of the polysaccharide. In principle, the crosslinking step may be carried out at any conceivable temperature, as long as the temperature is high enough to enable an at least partial crosslinking of the polysaccharide gel by the polyphosphate or the polyphosphoric acid and does not exceed a temperature that leads to degradation of the polysaccharide.

Attention to the crosslinking or drying temperatures is required so that the parameters such as the polymer content of the gel, the pH value of the mixture, the mixing process, the crosslinking or drying temperature respectively, and the duration of drying influence each other and may be selected in conjunction with each other in such a way that during the crosslinking of the polysaccharide with the polyphosphate or the polyphosphoric acid no internal crosslinking of the hydrogel occurs. If, e.g. in the production of the polysaccharide gel an aqueous solution with a pH value below about 7 is used, when using polycarboxypolysaccharides, part of the carboxylate groups present in the polysaccharide derivative is converted into the free acid form, which above all towards the end of the drying may function as internal crosslinkers by means of an esterification with the hydroxyl groups. In order to avoid or as far as possible suppress this, in principle undesired, internal crosslinking, the crosslinking or drying respectively in these cases may occur at temperatures within the range from about 70 to about 100° C. The pH value may be adjusted to about 6 or more. In one embodiment of the invention, for the production of the polysaccharide gel, an aqueous solution is selected with a pH value of about 7 or more and the crosslinking or drying respectively carried out at temperatures above about 110° C., such as above about 115 to about 120° C.

Various processes are known for the drying of the polysaccharide gels. Possible processes include, e.g. vapor drying, evaporation drying, radiation drying (example: infrared drying), high frequency drying (example: microwave drying), vacuum drying, freeze drying or spray drying. The drying may thus occur for example according to the thin film drying process, e.g. with the aid of a two axis roll dryer according to the plate drying process, according to which the hydrogel polymer particles are loaded onto plates in several layers in a drying chamber, in which hot air circulates, according to the rotating drum process using roll dryers or according to the conveyor belt process, in the following also described as belt drying. Belt drying, in which trays provided with holes of a circular conveyor in a tunnel is charged with product to be dried and product is dried during the conveying by the blowing of hot air through the tray holes, represents the most economical drying process for water-swellable hydrophilic hydrogels.

In another embodiment of the invention, the moisture of the polymer obtained by drying the polysaccharide gel may be less than about 30 wt %, or less than about 15 wt %, or less than about 10 wt %. If the polysaccharide gel is produced in a continuous mixer, such as an extruder, the initial products that are not yet post-crosslinked at the surface may, at pH values of about 7 and above, have retentions of greater than or equal to about 40 g/g, which prove to be stable upon tempering above about 60 minutes and about 120° C., and only differ slightly from products which have been prepared with higher pH values. If the hydrogels are prepared, on the other hand, in a batch process, the stability with respect to a tempering increases with increasing pH value of the gel. An exemplary pH setting for the formation of hydrogel in the batch process therefore lies at pH of about 10 or more.

In another embodiment of the process according to the invention, in an additional process step the crosslinked polycarboxypolysaccharide obtained after the drying of the polysaccharide gel or respectively, the comminuted polysaccharide gel is milled in a further process step. Through the comminution of the polysaccharide gel as well as by the milling of the dried crosslinked polycarboxypolysaccharide, a particulate crosslinked polysaccharides is obtained. For the subsequent milling of the dried polysaccharide gel, or the dried and previously comminuted polysaccharide gel, the product may be cooled to be dried in the last section of the belt drying to temperatures of less than about 70° C., such as about 60° C., and such as less than about 50° C. The dried, cooled polysaccharide gel, or comminuted polysaccharide gel, may be first pre-broken, for example using a finger breaker. The thus pre-comminuted dried gel particles are then milled, whereby the milling occurs using a roller mill, in order to maintain the production of fine particles as small as possible. In one embodiment, the milling may occur in two steps; first via a cause roller mill, then via a fine roller mill, whereby the latter may in turn be in one or two steps.

The particulate crosslinked polysaccharides of the present invention generally include particle sizes ranging from about 150 to about 850 microns. The present invention may include at least about 40 wt % of the particles having a particle size from about 300 μm to about 600 μm, or at least about 50 wt % of the particles having a particle size from about 300 μm to about 600 μm, or at least about 60 wt % of the particles having a particle size from about 300 μm to about 600 μm as measured by screening through a U.S. standard 30 mesh screen and retained on a U.S. standard 50 mesh screen. In addition, the size distribution of the particulate crosslinked polysaccharides of the present invention may include less than about 30% by weight of SAP particles having a size greater than about 600 microns, and less than about 30% by weight of SAP particles having a size of less than about 300 microns as measured using for example a RO-TAP® Mechanical Sieve Shaker Model B available from W. S. Tyler, Inc., Mentor Ohio. Particles that are too course may be subjected to the milling again, particles which are too fine may be recycled in the production process.

An inorganic material may be brought into contact with the crosslinked polysaccharide particulate, which is suitable for modifying the properties of water-absorbent polymers. To the exemplary inorganic materials belong silicates, in particular scaffold silicates such as zeolites or silicates which have been obtained by drying aqueous silicic acid solutions or silica sols, for example the commercially obtainable products such as precipitated silicic acids and pyrogenic silicic acids, for example aerosils, aluminates, titanium dioxides, zinc oxides, clay materials and further minerals familiar to the skilled person as well as carbon-containing inorganic materials.

In another aspect of the invention, when using the above-mentioned inorganic materials or mixtures thereof, these materials, in a quantity within a range from about 0.1 to about 1 wt %, such as in a quantity within a range from about 0.25 to about 0.75 wt %, and such as within a range from about 0.4 to about 0.6 wt %, based upon the total weight of the crosslinked polysaccharides, may be brought into contact with the crosslinked polysaccharides.

According to another embodiment of the invention, the inorganic materials may have a specific surface area determined according to the BET method within a range from about 30 to about 850 m$^2$/g, such as within a range from about 40 to about 500 m$^2$/g, such as within a range from about 100 to about 300 m$^2$/g, and such as within a range from about 150 to about 250 m$^2$/g. In general, and in the case that the inorganic materials are sipemates or aerosils, the surface area lies within a range from about 30 to about 850 m$^2$/g, such as within a range from about 40 to about 500 m$^2$/g, such as within a range from about 100 to about 300 m$^2$/g and is determined using nitrogen in an Areameter according to ISO 5794, Annex D.

When using inorganic materials in the form of particles, at least about 90 wt %, or at least about 95 wt %, or at least about 99 wt % of the inorganic material have a particle size of less than about 200 μm, or less than about 100 μm, or less than about 1 μm, or as less than about 500 nm, or less than about 100 nm. The sipernates have a particle size of from about 10 to about 180 μm, or from about 20 to about 150 μm, or from about 30 to about 110 μm. The sipernates have, in another embodiment of the process according to the invention, a particle size of from about 1 to about 40 μm, or from about 2 to about 30 μm, or from about 3 to about 20 μm. These may have average particle sizes determined according to the Multisizer Capillary Method according to ASTM C690-1992. Aerosils may be characterized by a particle size within the range from about 5 to about 50 nm, such as within the range from about 8 to about 20 nm (such as "Aerosil 200" from Degussa AG). The particle size may be determined according to ASTM C690-1992 with a multisizer.

The invention also relates to a water-absorbent partially neutralized polysaccharide that is obtainable by the above described process. The water-absorbing polysaccharide obtainable by the process according to the invention may be characterized by an excellent absorption and retention capacity for water, aqueous solutions and body fluids. At the same time it has available, by means of the targeted crosslinking of the surfaces, a clearly improved absorption capacity for aqueous solution against an external pressure. The water-absorbing polysaccharide obtainable by the process according to the invention is, furthermore, stable upon storage, substantially free from residual monomer parts and organic solvents which frequently occur in the production of polyacrylates, only slightly soluble in aqueous liquids and, to high degree, biodegradable.

The present invention further relates to a water-absorbent polysaccharide particulate, whereby the polysaccharide is crosslinked with a polyphosphate or with polyphosphoric acid in a quantity of from about 0.001 to about 20 wt %, of from about 0.01 to about 10 wt %, of from about 0.05 to about 5 wt %, respectively based upon the weight of the polysaccharide and surface treated with a multivalent metal salt or an acid. The acid may be a weak acid such as acetic acid, lactic acid, citric acid, glyconic acid, and gluconic acid.

The invention additionally relates to a particulate water-absorbent polysaccharide, with at least about 5 wt %, or at least about 90 wt %, respectively based upon the water-absorbent polysaccharide, of a branched polysaccharide, such as cellulose and/or derivatives thereof, whereby the water-absorbing polysaccharide has a surface part coated with an inorganic particle. In an additional aspect, the polysaccharide superabsorbent particulate according to the invention may have a binding agent at least in the surface part. The polysaccharide superabsorbent particulate according to the invention may have inorganic particles, for example, in a quantity of from about 0.001 to about 20 wt %, of from about 0.01 to about 10 wt %, respectively based upon the polysaccharide superabsorbent particulate according to the invention. Independent thereof, the polysaccharide superabsorbent particulate according to the invention has binding agent, for example, in a quantity of from about 0.001 to about 20 wt %, or from about 0.01 to about 10 wt %, respectively based upon the polysaccharide superabsorbent particulate according to the invention. In one aspect of the invention, those polysaccharides which have already been cited in connection with the process according to the invention for producing a polysaccharide superabsorbent particulate are utilized, whereby the same is also true for inorganic particles and for binding agents.

The polysaccharide superabsorbent particulate of the present invention exhibits certain characteristics, or properties, as measured by Free Swell Gel Bed Permeability (GBP), Centrifuge Retention Capacity (CRC), and absorbency under load at about 0.9 psi (AUL(0.9 psi)). The Free Swell Gel Bed Permeability (GBP) Test is a measurement of the permeability of a swollen bed of superabsorbent material in Darcy (e.g., separate from the absorbent structure) under a confining pressure after what is commonly referred to as "free swell" conditions. In this context, the term "free swell" means that the superabsorbent material is allowed to swell without a swell restraining load upon absorbing test solution as will be described. The Centrifuge Retention Capacity (CRC) Test measures the ability of the superabsorbent polymer composition to retain liquid therein after being saturated and subjected to centrifugation under controlled conditions. The resultant retention capacity is stated as grams of liquid retained per gram weight of the sample (g/g).

A polysaccharide superabsorbent particulate made by a process of present invention may have a centrifuge retention capacity of from about 25 g/g to about 40 g/g, or from about 26 to about 30 g/g; and may have an absorption under load at 0.9 psi of from about 10 g/g to about 20 g/g, or from about 13 g/g to about 18 g/g, and a free swell gel bed permeability of from about 5 to about 100 Darcy, a permeability half-life of at least about 30 days, or at least about 60 days, or at least 180 days, a biodegradability determined according to the herein-described test method of at least about 40% in about 90 days, or at least about 50% in about 90 days, or at least about 65% in about 90 days, or at least about 75% in about 90 days.

In another embodiment of the polysaccharide superabsorbent particulate according to the invention, a biodegradability determined according to the herein-described test method is present from about 25 to about 50% in about 45 days and from more than about 50 to about 90% in about 90 days, or at least about 28% in about 45 days and at least about 51% in about 90 days.

Furthermore, the polysaccharide superabsorbent polymer particulate obtainable by the process according to an embodiment of the invention is storage-stable, substantially free from residual monomers, and organic solvents, and only soluble in aqueous liquids to a very small degree, and to a large degree biodegradable.

The invention further relates an absorbent material comprising a blend or mixture of the polysaccharide superabsorbent polymer particulate as set forth in the present invention and a different superabsorbent polymer particle, such as any superabsorbent polymer particle commercially available. Such a blend or mixture may include from about 10 to about 90 wt % polysaccharide superabsorbent polymer particulate as set forth in the present invention and from about 90 to about 10 wt % of a different superabsorbent polymer particulate.

The invention further relates to a composite comprising an above-defined polysaccharide superabsorbent particulate and a substrate. In one aspect, the polysaccharide superabsorbent particulate according to the invention and the substrate are firmly bound together. Sheets made from polymers may be used as a substrate, for example, from polyethylene, polypropylene or polyamide, metals, non-woven materials, fluff, tissues, woven materials, natural or synthetic fibers, or other foams. The composite may be sealant materials, cables, absorbent cores as well as diapers and hygiene articles comprising these. The invention further relates to a process for producing a composite, wherein a polysaccharide superabsorbent particulate according to the invention and a substrate and optionally a suitable additive are brought into contact with each other. In one aspect, the bringing into contact occurs by wetland and air laid processes, compacting, extruding, and mixing.

The invention is now more closely described by means of test methods and non-limiting examples.

Test Procedures

Centrifuge Retention Capacity Test

The Centrifuge Retention Capacity (CRC) Test measures the ability of the superabsorbent polymer to retain liquid therein after being saturated and subjected to centrifugation under controlled conditions. The resultant retention capacity is stated as grams of liquid retained per gram weight of the sample (g/g). The sample to be tested is prepared from particles that are pre-screened through a U.S. standard 30-mesh screen and retained on a U.S. standard 50-mesh screen. As a result, the superabsorbent polymer sample comprises particles sized in the range of about 300 to about 600 microns. The particles can be pre-screened by hand or automatically.

The retention capacity is measured by placing about 0.2 grams of the pre-screened superabsorbent polymer sample into a water-permeable bag that will contain the sample while allowing a test solution (0.9 weight percent sodium chloride in distilled water) to be freely absorbed by the sample. A heat-sealable tea bag material, such as that available from Dexter Corporation (having a place of business in Windsor Locks, Conn., U.S.A.) as model designation 1234T heat sealable filter paper works well for most applications. The bag is formed by folding a 5-inch by 3-inch sample of the bag material in half and heat-sealing two of the open edges to form a 2.5-inch by 3-inch rectangular pouch. The heat seals are about 0.25 inches inside the edge of the material. After the sample is placed in the pouch, the remaining open edge of the pouch is also heat-sealed. Empty bags are also made to serve as controls. Three samples are prepared for each superabsorbent polymer composition to be tested.

The sealed bags are submerged in a pan containing the test solution at about 23° C., making sure that the bags are held down until they are completely wetted. After wetting, the samples remain in the solution for about 30 minutes, at which time they are removed from the solution and temporarily laid on a non-absorbent flat surface.

The wet bags are then placed into the basket wherein the wet bags are separated from each other and are placed at the outer circumferential edge of the basket, wherein the basket is of a suitable centrifuge capable of subjecting the samples to a g-force of about 350. One suitable centrifuge is a CLAY ADAMS DYNAC II, model #0103, having a water collection basket, a digital rpm gauge, and a machined drainage basket adapted to hold and drain the flat bag samples. Where multiple samples are centrifuged, the samples are placed in opposing positions within the centrifuge to balance the basket when spinning. The bags (including the wet, empty bags) are centrifuged at about 1,600 rpm (e.g., to achieve a target g-force of about 290 g force with a variance from about 280 to about 300 g force), for 3 minutes. G force is defined as a unit of inertial force on a body that is subjected to rapid acceleration or gravity, equal to 32 ft/sec$^2$ at sea level. The bags are removed and weighed, with the empty bags (controls) being weighed first, followed by the bags containing the superabsorbent polymer composition samples. The amount of solution retained by the superabsorbent polymer sample, taking into account the solution retained by the bag itself, is the centrifuge retention capacity (CRC) of the superabsorbent polymer, expressed as grams of fluid per gram of superabsorbent polymer. More particularly, the retention capacity is determined by the following equation:

$$\frac{sample/bag\ after\ centrifuge - empty\ bag\ after\ centrifuge - dry\ sample\ weight}{dry\ sample\ weight}$$

The three samples are tested, and the results are averaged to determine the Centrifuge Retention Capacity (CRC) of the superabsorbent polymer composition.

Free-Swell Gel Bed Permeability Test (FSGBP)

Figure 2:
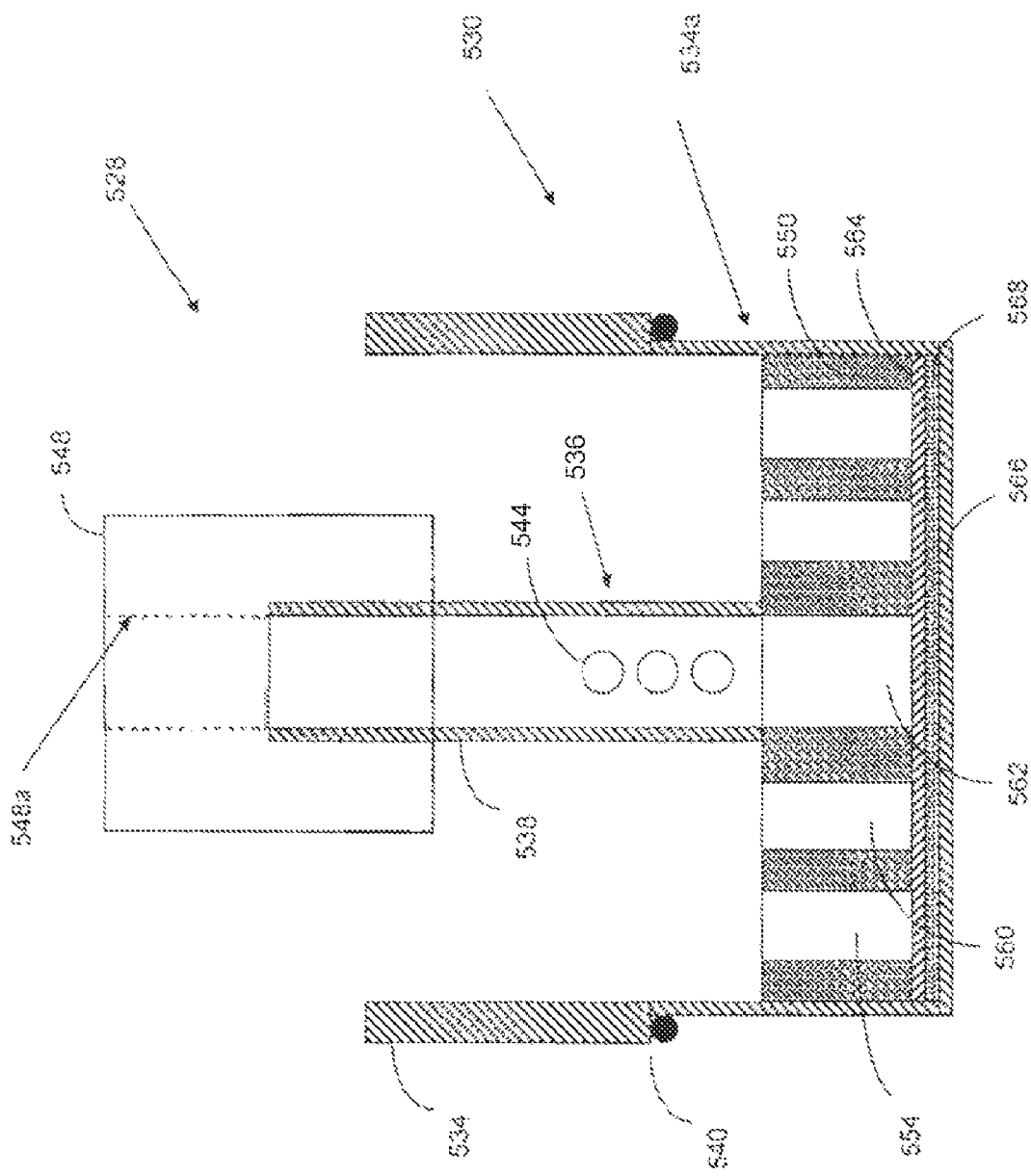
FIG. 2 is a cross-sectional side view of a cylinder/cup assembly employed in the Free Swell Gel Bed Permeability Test apparatus shown in FIG. 1.
Figure 3:
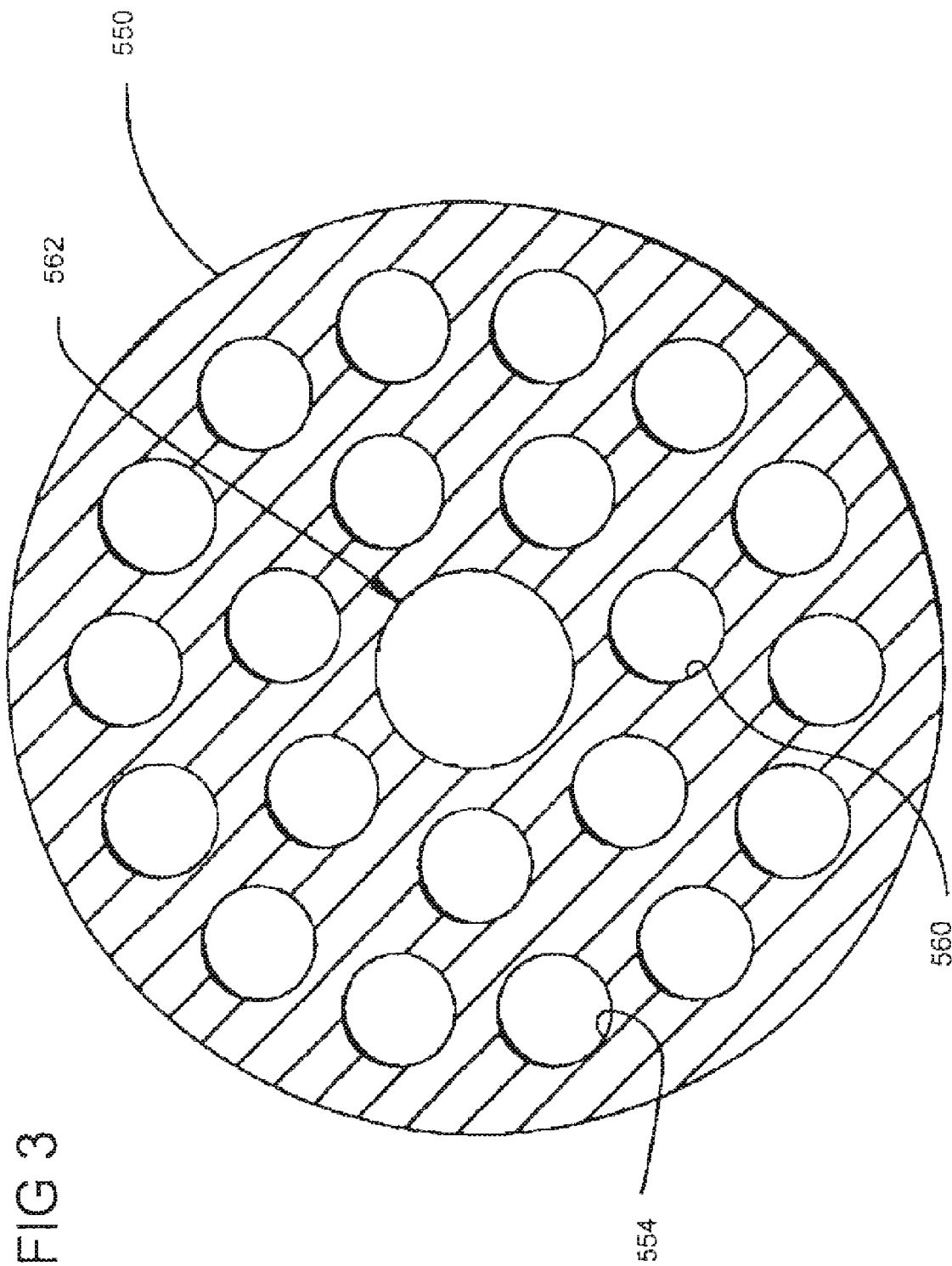
FIG. 3 is a top view of a plunger employed in the Free Swell Gel Bed Permeability Test apparatus shown in FIG. 1.

As used herein, the Free-Swell Gel Bed Permeability Test, also referred to as the Gel Bed Permeability (GBP) Under 0 psi Swell Pressure Test, determines the permeability of a swollen bed of gel particles (e.g., such as the surface treated absorbent material or the superabsorbent material prior to being surface treated), under what is commonly referred to as "free swell" conditions. The term "free swell" means that the gel particles are allowed to swell without a restraining load upon absorbing test solution as will be described. A suitable apparatus for conducting the Gel Bed Permeability Test is shown in FIGS. 1, 2 and 3 and indicated generally as 500. The test apparatus assembly 528 comprises a sample container, generally indicated at 530, and a plunger, generally indicated at 536. The plunger comprises a shaft 538 having a cylinder hole bored down the longitudinal axis and a head 550 positioned at the bottom of the shaft. The shaft hole 562 has a diameter of about 16 mm. The plunger head is attached to the shaft, such as by adhesion. Twelve holes 544 are bored into the radial axis of the shaft, three positioned at every 90 degrees having diameters of about 6.4 mm. The shaft 538 is machined from a LEXAN rod or equivalent material and has an outer diameter of about 2.2 cm and an inner diameter of about 16 mm.

The plunger head 550 has a concentric inner ring of seven holes 560 and an outer ring of 14 holes 554, all holes having a diameter of about 8.8 millimeters as well as a hole of about 16 mm aligned with the shaft. The plunger head 550 is machined from a LEXAN rod or equivalent material and has a height of approximately 16 mm and a diameter sized such that it fits within the cylinder 534 with minimum wall clearance but still slides freely. The total length of the plunger head 550 and shaft 538 is about 8.25 cm, but can be machined at the top of the shaft to obtain the desired mass of the plunger 536. The plunger 536 comprises a 100 mesh stainless steel cloth screen 564 that is biaxially stretched to tautness and attached to the lower end of the plunger 536. The screen is attached to the plunger head 550 using an appropriate solvent that causes the screen to be securely adhered to the plunger head 550. Care must be taken to avoid excess solvent migrating into the open portions of the screen and reducing the open area for liquid flow. Acrylic solvent Weld-on 4 from IPS Corporation (having a place of business in Gardena, Calif., USA) is a suitable solvent.

The sample container 530 comprises a cylinder 534 and a 400 mesh stainless steel cloth screen 566 that is biaxially stretched to tautness and attached to the lower end of the cylinder 534. The screen is attached to the cylinder using an appropriate solvent that causes the screen to be securely adhered to the cylinder. Care must be taken to avoid excess solvent migrating into the open portions of the screen and reducing the open area for liquid flow. Acrylic solvent Weld-on 4 from IPS Corporation (having a place of business in Gardena, Calif., USA) is a suitable solvent. A gel particle sample, indicated as 568 in FIG. 2, is supported on the screen 566 within the cylinder 534 during testing.

The cylinder 534 may be bored from a transparent LEXAN rod or equivalent material, or it may be cut from a LEXAN tubing or equivalent material, and has an inner diameter of about 6 cm (e.g., a cross-sectional area of about 28.27 cm$^2$), a wall thickness of about 0.5 cm and a height of approximately 7.95 cm. A step is machined into the outer diameter of the cylinder 534 such that a region 534a with an outer diameter of 66 mm exists for the bottom 31 mm of the cylinder 534. An o-ring 540 which fits the diameter of region 534a may be placed at the top of the step.

The annular weight 548 has a counter-bored hole about 2.2 cm in diameter and 1.3 cm deep so that it slips freely onto the shaft 538. The annular weight also has a thru-bore 548a of about 16 mm. The annular weight 548 can be made from stainless steel or from other suitable materials resistant to corrosion in the presence of the test solution, which is 0.9 weight percent sodium chloride solution in distilled water. The combined weight of the plunger 536 and annular weight 548 equals approximately 596 grams (g), which corresponds to a pressure applied to the sample 568 of about 0.3 pounds per square inch (psi), or about 20.7 dynes/cm$^2$ (2.07 kPa), over a sample area of about 28.27 28.27 cm$^2$.

When the test solution flows through the test apparatus during testing as described below, the sample container 530 generally rests on a weir 600. The purpose of the weir is to divert liquid that overflows the top of the sample container 530 and diverts the overflow liquid to a separate collection device 601. The weir can be positioned above a scale 602 with a beaker 603 resting on it to collect saline solution passing through the swollen sample 568.

To conduct the Gel Bed Permeability Test under "free swell" conditions, the plunger 536, with the weight 548 seated thereon, is placed in an empty sample container 530 and the height from the top of the weight 548 to the bottom of the sample container 530 is measured using a suitable gauge accurate to 0.01 mm. The force the thickness gauge applies during measurement should be as low as possible, preferably less than about 0.74 Newtons. It is important to measure the height of each empty sample container 530, plunger 536, and weight 548 combination and to keep track of which plunger 536 and weight 548 is used when using multiple test apparatus. The same plunger 536 and weight 548 should be used for measurement when the sample 568 is later swollen following saturation. It is also desirable that the base that the sample cup 530 is resting on is level, and the top surface of the weight 548 is parallel to the bottom surface of the sample cup 530.

The sample to be tested is prepared from superabsorbent polymer composition particles which are prescreened through a U.S. standard 30 mesh screen and retained on a U.S. standard 50 mesh screen. As a result, the test sample comprises particles sized in the range of about 300 to about 600 microns. The superabsorbent polymer particles can be prescreened with, for example, a RO-TAP Mechanical Sieve Shaker Model B available from W. S. Tyler, Inc., Mentor Ohio. Sieving is conducted for 10 minutes. Approximately 2.0 grams of the sample is placed in the sample container 530 and spread out evenly on the bottom of the sample container. The container, with 2.0 grams of sample in it, without the plunger 536 and weight 548 therein, is then submerged in the 0.9% saline solution for a time period of about 60 minutes to saturate the sample and allow the sample to swell free of any restraining load. During saturation, the sample cup 530 is set on a mesh located in the liquid reservoir so that the sample cup 530 is raised slightly above the bottom of the liquid reservoir. The mesh does not inhibit the flow of saline solution into the sample cup 530. A suitable mesh can be obtained as part number 7308 from Eagle Supply and Plastic, having a place of business in Appleton, Wis., U.S.A. Saline does not fully cover the superabsorbent polymer composition particles, as would be evidenced by a perfectly flat saline surface in the test cell. Also, saline depth is not allowed to fall so low that the surface within the cell is defined solely by swollen superabsorbent, rather than saline.

At the end of this period, the plunger 536 and weight 548 assembly is placed on the saturated sample 568 in the sample container 530 and then the sample container 530, plunger 536, weight 548, and sample 568 are removed from the solution. After removal and before being measured, the sample container 530, plunger 536, weight 548, and sample 568 are to remain at rest for about 30 seconds on a suitable flat, large grid non-deformable plate of uniform thickness. The thickness of the saturated sample 568 is determined by again measuring the height from the top of the weight 548 to the bottom of the sample container 530, using the same thickness gauge used previously provided that the zero point is unchanged from the initial height measurement. The sample container 530, plunger 536, weight 548, and sample 568 may be placed on a flat, large grid non-deformable plate of uniform thickness that will prevent liquid in the sample container from being released onto a flat surface due to surface tension. The plate has an overall dimension of 7.6 cm by 7.6 cm, and each grid has a cell size dimension of 1.59 cm long by 1.59 cm wide by 1.12 cm deep. A suitable flat, large grid non-deformable plate material is a parabolic diffuser panel, catalogue number 1624K27, available from McMaster Carr Supply Company, having a place of business in Chicago, Ill., U.S.A., which can then be cut to the proper dimensions. This flat, large mesh non-deformable plate must also be present when measuring the height of the initial empty assembly. The height measurement should be made as soon as practicable after the thickness gauge is engaged. The height measurement obtained from measuring the empty sample container 530, plunger 536, and weight 548 is subtracted from the height measurement obtained after saturating the sample 568. The resulting value is the thickness, or height "H" of the swollen sample.

The permeability measurement is initiated by delivering a flow of the 0.9% saline solution into the sample container 530 with the saturated sample 568, plunger 536, and weight 548 inside. The flow rate of test solution into the container is adjusted to cause saline solution to overflow the top of the cylinder 534 thereby resulting in a consistent head pressure equal to the height of the sample container 530. The test solution may be added by any suitable means that is sufficient to ensure a small, but consistent amount of overflow from the top of the cylinder, such as with a metering pump 604. The overflow liquid is diverted into a separate collection device 601. The quantity of solution passing through the sample 568 versus time is measured gravimetrically using the scale 602 and beaker 603. Data points from the scale 602 are collected every second for at least sixty seconds once the overflow has begun. Data collection may be taken manually or with data collection software. The flow rate, Q, through the swollen sample 568 is determined in units of grams/second (g/s) by a linear least-square fit of fluid passing through the sample 568 (in grams) versus time (in seconds).

Permeability in $cm^2$ is obtained by the following equation: $K=[Q*H*\mu]/[A*\rho*P]$, where K=Permeability ($cm^2$), Q=flow rate (g/sec), H=height of swollen sample (cm), $\mu$=liquid viscosity (poise) (approximately one centipoise for the test solution used with this Test), A=cross-sectional area for liquid flow (28.27 $cm^2$ for the sample container used with this Test), $\rho$=liquid density ($g/cm^3$) (approximately one $g/cm^3$, for the test solution used with this Test) and P=hydrostatic pressure ($dynes/cm^2$) (normally approximately 7,797 $dynes/cm^2$). The hydrostatic pressure is calculated from $P=\rho*g*h$, where $\rho$=liquid density ($g/cm^3$), g=gravitational acceleration, nominally 981 $cm/sec^2$, and h=fluid height, e.g., 7.95 cm for the Gel Bed Permeability Test described herein.

A minimum of two samples are tested and the results are averaged to determine the gel bed permeability of the sample.

Absorbency Under Load (AUL0.9 psi) Test

The Absorbency Under Load (AUL) Test measures the ability of the superabsorbent polymer composition particles to absorb a 0.9 weight percent solution of sodium chloride in distilled water at room temperature (test solution) while the material is under a load of 0.9 psi. The apparatus for testing AUL consists of:

An AUL assembly including a cylinder, a 4.4 g piston, and a standard 317 gm weight. The components of this assembly are described in additional detail below.

A flat-bottomed square plastic tray that is sufficiently broad to allow the glass frits to lay on the bottom without contact with the tray walls. A plastic tray that is 9" by 9" (22.9 cm×22.9 cm), with a depth of 0.5 to 1" (1.3 cm to 2.5 cm) is commonly used for this test method.

A 12.5 cm diameter sintered glass frit with a 'C' porosity (25-50 microns).

This frit is prepared in advance through equilibration in saline (0.9% sodium chloride in distilled water, by weight). In addition to being washed with at least two portions of fresh saline, the frit must be immersed in saline for at least 12 hours prior to AUL measurements.

Whatman Grade 1, 12.5 cm diameter filter paper circles.

A supply of saline (0.9% sodium chloride in distilled water, by weight).

Referring to FIG. 4, the cylinder 412 of the AUL assembly 400 used to contain the superabsorbent polymer composition particles 410 is made from one-inch (2.54 cm) inside diameter thermoplastic tubing machined-out slightly to be sure of concentricity. After machining, a 400 mesh stainless steel wire cloth 414 is attached to the bottom of the cylinder 412 by heating the steel wire cloth 414 in a flame until red hot, after which the cylinder 412 is held onto the steel wire cloth until cooled. A soldering iron can be utilized to touch up the seal if unsuccessful or if it breaks. Care must be taken to maintain a flat smooth bottom and not distort the inside of the cylinder 412.

The 4.4 g piston (416) is made from one-inch diameter solid material (e.g., PLEXIGLAS®) and is machined to closely fit without binding in the cylinder 412.

A standard 317 gm weight 418 is used to provide a 62,053 dyne/cm$^2$ (about 0.9 psi) restraining load. The weight is a cylindrical, 1 inch(2.5 cm) diameter, stainless steel weight that is machined to closely fit without binding in the cylinder.

Unless specified otherwise, a sample 410 corresponding to a layer of at least about 300 gsm. (0.16 g) of superabsorbent polymer composition particles is utilized for testing the AUL. The sample 410 is taken from superabsorbent polymer composition particles that are pre-screened through U.S. standard #30 mesh and retained on U.S. std. #50 mesh. The superabsorbent polymer composition particles can be pre-screened with, for example, a RO-TAP® Mechanical Sieve Shaker Model B available from W. S. Tyler, Inc., Mentor Ohio. Sieving is conducted for about 10 minutes.

The inside of the cylinder 412 is wiped with an antistatic cloth prior to placing the superabsorbent polymer composition particles 410 into the cylinder 412.

The desired amount of the sample of sieved superabsorbent polymer composition particles 410 (about 0.16 g) is weighed out on a weigh paper and evenly distributed on the wire cloth 414 at the bottom of the cylinder 412. The weight of the superabsorbent polymer composition particles in the bottom of the cylinder is recorded as 'SA,' for use in the AUL calculation described below. Care is taken to be sure no superabsorbent polymer particles cling to the wall of the cylinder. After carefully placing the 4.4 g piston 412 and 317 g weight 418 on the superabsorbent polymer composition particles 410 in the cylinder 412, the AUL assembly 400 including the cylinder, piston, weight, and superabsorbent polymer composition particles is weighed, and the weight is recorded as weight 'A'.

A sintered glass frit 424 (described above) is placed in the plastic tray 420, with saline 422 added to a level equal to that of the upper surface of the glass frit 424. A single circle of filter paper 426 is placed gently on the glass frit 424, and the AUL assembly 400 with the superabsorbent polymer composition particles 410 is then placed on top of the filter paper 426. The AUL assembly 400 is then allowed to remain on top of the filter paper 426 for a test period of one hour, with attention paid to keeping the saline level in the tray constant. At the end of the one hour test period, the AUL apparatus is then weighed, with this value recorded as weight 'B.'

The AUL(0.9 psi) is calculated as follows:

$$AUL(0.9\ psi)=(B-A)/SA$$

wherein
A=Weight of AUL Unit with dry SAP
B=Weight of AUL Unit with SAP after 60 minutes absorption
SA=Actual SAP weight A minimum of two tests is performed and the results are averaged to determine the AUL value under 0.9 psi load. The samples are tested at about 23° C. and about 50% relative humidity.

Permeability Half-Life Test

The Permeability Half-life Test measures the storage stability of the superabsorbent polymer in presence of moisture under controlled conditions. The resultant permeability half-life is stated as days required for the gel bed permeability to decrease to half of its initial value. The sample to be tested is coated with 5% of water based on the weight of the superabsorbent polymer and relaxed at room temperature for one day. The water applied on the sample is to mimic the moisture pick-up during the storage of superabsorbent polymer in the real situation. The coated sample is sealed in a glass bottle and stored at 50° C. in a lab oven. The FSGBP of the sample is measured weekly or bi-weekly for about two months. The FSGBP values are plotted against the aging time and an exponential trend line is fitted to the data points to determine the permeability half-life.

EXAMPLE 1

Preparation of Superabsorbent Polymer

Polyphosphoric acid (115% from Sigma-Aldrich) in a quantity of 0.1 wt. %, based upon the amount of sodium carboxymethylcellulose, was dissolved in deionized water and the pH value adjusted with sodium hydroxide to 11.5. The sodium carboxymethylcellulose (Cekol. RTM. 100,000 from the company Noviant, Netherlands, with an active substance content of 15 wt. %) was homogeneously kneaded into the solution and then extruded through a meat grinder. The extruded gel was then dried in a Procter & Schwartz Model 062 forced air oven at the temperatures of 120° C. for 60 minutes. The dried material was coarse-ground in a Prodeva Model 315-S crusher, milled in an MPI 666-F three-stage roller mill and sieved with a Minox MTS 600DS3V to remove particles greater than 850 μm and smaller than 150 μm. The particles between 150 μm and 850 μm were coated with 12.5 wt % of an aqueous solution of neutralized polyphosphoric acid (pH of 11.0, 6 wt. %), 0.55 wt % of Sipemat 22s® (available from Evonik-Degussa). The coated sample was then heated in a convection oven at 135° C. for 75 minutes for surface crosslinking. The surface crosslinked particulate material was then sieved with 20/100 mesh US standard sieves to remove particles greater than 850 μm and smaller than 150 μm. The sample A1 obtained showed the following properties:

TABLE 1

| Sample | CRC (g/g) | AUL0.9 psi (g/g) | FSGBP (darcy) |
|--------|-----------|------------------|---------------|
| A1     | 19.2      | 15.5             | 35            |

EXAMPLE 2

300 g of sample A1 was stirred in a Kitchen-Aid mixer. A Paasche airbrush sprayer was used to apply aluminum sulfate solution (3 grams of $Al_2(SO_4)_3 \cdot 14H_2O$ in 15 grams of water) onto the particles, with the mixer on high speed while liquid was spraying. The treated sample A2 was allowed to relax for one day prior to being stored at 50° C. for the Permeability Half-life Test. The results are summarized in Table 2. The permeability half-life of sample A2 was calculated to be about 75 days.

TABLE 2

| Aging Time (days) | GBP (Darcy) | GBP Drop (%) |
|-------------------|-------------|--------------|
| 0                 | 52          | 0            |
| 7                 | 49          | 6            |
| 13                | 44          | 14           |
| 20                | 38          | 26           |
| 27                | 37          | 29           |

TABLE 2-continued

| Aging Time (days) | GBP (Darcy) | GBP Drop (%) |
|---|---|---|
| 34 | 34 | 35 |
| 41 | 36 | 30 |
| 48 | 29 | 43 |
| 68 | 28 | 45 |

EXAMPLE 3

300 g of sample A1 was stirred in a Kitchen-Aid mixer. A Paasche airbrush sprayer was used to apply lactic acid solution (1.5 grams of lactic acid in 15 grams of water) onto the particles, with the mixer on high speed while liquid was spraying. The treated sample A3 was allowed to relax for one day prior to being stored at 50° C. for the Permeability Half-life Test. The results are summarized in Table 3. Sample A3 demonstrated relatively constant GBP over the test period.

TABLE 3

| Aging Time (days) | GBP (Darcy) | GBP Drop (%) |
|---|---|---|
| 0 | 32 | 0 |
| 7 | 31 | 3 |
| 18 | 27 | 15 |
| 34 | 32 | 2 |
| 49 | 32 | 0 |

COMPARATIVE EXAMPLE A4

300 g of sample A1 was stirred in a Kitchen-Aid mixer. A Paasche airbrush sprayer was used to apply 15 grams of water onto the particles, with the mixer on high speed while liquid was spraying. The treated comparative sample A4 was allowed to relax for one day prior to being stored at 50° C. for the Permeability Half-life Test. The results are summarized in Table 4. The permeability half-life of sample A4 was calculated to be about 25 days.

TABLE 4

| Aging Time (days) | GBP (Darcy) | GBP Drop (%) |
|---|---|---|
| 0 | 34 | 0 |
| 7 | 23 | 34 |
| 13 | 23 | 34 |
| 20 | 18 | 49 |
| 27 | 16 | 52 |
| 34 | 14 | 60 |
| 41 | 11 | 67 |
| 48 | 11 | 68 |
| 68 | 5 | 85 |

As we can see from Table 4 and FIG. 5, sample A4 is lest stable among these three samples. Its GBP decreased quickly, with Permeability Half-life around 25 days under accelerated test conditions. The surface treated samples A2 and A3 demonstrated stability improvement, with Permeability Half-life about 75 days or longer as shown in Table 5.

TABLE 5

| Sample | Permeability Half-life (days) |
|---|---|
| A2 (w/Al-sulfate) | ~75 |
| A3 (w/lactic acid) | >180 |
| A4 (comparative) | ~25 |

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

What is claimed is:

1. A polysaccharide superabsorbent polymer particulate comprising:
   a. a polysaccharide polymer crosslinked with a polyphosphate or polyphosphoric acid as a crosslinking agent to form a polysaccharide polymer gel which is formed into a polysaccharide polymer particulate having a particle size ranging from about 150 μm to about 850 μm;
   b. a surface crosslinking agent selected from a polyphosphate or polyphosphoric acid forming crosslinks of the surface crosslinking agent and the polysaccharide superabsorbent polymer particulate resulting in a surface crosslinked polysaccharide superabsorbent polymer particulate wherein the level of functional cross links in the vicinity of the surface of the polysaccharide superabsorbent polymer particulate is greater than the level of functional cross links in the interior of the polysaccharide superabsorbent polymer particulate; and
   c. a post-crosslinking agent selected from a water soluble multivalent metal salt or an acid wherein the water soluble multivalent metal salt includes a metal cation selected from Al, Fe, Zr, Mg, or Zn and the acid is selected from phosphoric acid, acetic acid, lactic acid, citric acid, glyconic acid and gluconic acid wherein the post-crosslinking agent is applied to the surface of the surface crosslinked polysaccharide superabsorbent polymer particulate to form polysaccharide superabsorbent polymer particulate;
   wherein the polysaccharide superabsorbent polymer particulate has a permeability half life of about 30 days or more.

2. The polysaccharide superabsorbent polymer particulate according to claim 1 wherein the polysaccharide is at least partially neutralized polycarboxypolysaccharide.

3. A polysaccharide superabsorbent polymer particulate comprising a post-crosslinking agent selected from a water soluble multivalent metal salt or an acid wherein the water soluble multivalent metal salt includes a metal cation selected from Al, Fe, Zr, Mg, or Zn and the acid is selected from phosphoric acid, acetic acid, lactic acid, citric acid, glyconic acid wherein the post-crosslinking agent is applied to a surface crosslinked polysaccharide superabsorbent polymer particulate and gluconic acid and having a permeability half life of about 30 days.

4. A superabsorbent material comprising:
 a. from about 1 to about 40 wt % of a polysaccharide superabsorbent polymer particulate having a permeability half life of about 30 days or more wherein the polysaccharide superabsorbent polymer particulate comprises
   i). a polysaccharide polymer crosslinked with a polyphosphate or polyphosphoric acid as a crosslinking agent to form a polysaccharide polymer gel which is formed into a polysaccharide polymer particulate having a particle size ranging from about 150 µm to about 850 µm;
   ii). a surface crosslinking agent selected from a polyphosphate or polyphosphoric acid forming crosslinks of the surface crosslinking agent and the polysaccharide superabsorbent polymer particulate resulting in a surface crosslinked polysaccharide superabsorbent polymer particulate; and
   iii). a post-crosslinking agent selected from a water soluble multivalent metal salt or an acid wherein the water soluble multivalent metal salt includes a metal cation selected from Al, Fe, Zr, Mg, or Zn and the acid is selected from phosphoric acid, acetic acid, lactic acid, citric acid, glyconic acid and gluconic acid wherein the post-crosslinking agent is applied to the surface crosslinked polysaccharide superabsorbent polymer particulate to form polysaccharide superabsorbent polymer particulate; and
 b. from about 60 to about 99 wt % of a second superabsorbent polymer particulate that is different from the polysaccharide superabsorbent polymer particulate.

5. The superabsorbent material of claim 4 wherein the second superabsorbent polymer particulate is an acrylate superabsorbent polymer.

6. An absorbent article comprising the polysaccharide superabsorbent polymer particulate of claim 4.

7. An absorbent article comprising a polysaccharide superabsorbent polymer particulate comprising:
 a. a polysaccharide polymer crosslinked with a polyphosphate or polyphosphoric acid as a crosslinking agent to form a polysaccharide polymer gel which is formed into a polysaccharide polymer particulate having a particle size ranging from about 150 µm to about 850 µm;
 b. a surface crosslinking agent selected from a polyphosphate or polyphosphoric acid forming crosslinks of the surface crosslinking agent and the polysaccharide superabsorbent polymer particulate resulting in a surface crosslinked polysaccharide superabsorbent polymer particulate; and
 c. a post-crosslinking agent selected from a water soluble multivalent metal salt or an acid wherein the water soluble multivalent metal salt includes a metal cation selected from Al, Fe, Zr, Mg, or Zn and the acid is selected from phosphoric acid, acetic acid, lactic acid, citric acid, glyconic acid and gluconic acid wherein the post-crosslinking agent is applied to the surface crosslinked polysaccharide superabsorbent polymer particulate to form polysaccharide superabsorbent polymer particulate and wherein the polysaccharide superabsorbent polymer particulate has a permeability half life of about 30 days or more.

8. A process for producing surface treated polysaccharide superabsorbent polymer particles, comprising the steps of:
 i. mixing a polysaccharide with a polyphosphate or polyphosphoric acid as a crosslinking agent in the presence of water to form a polysaccharide gel;
 ii. drying the polysaccharide gel;
 iii. comminuting the dried polysaccharide gel to form dried polysaccharide superabsorbent polymer particles having a particle size ranging from about 150 µm to about 850 µm as measured by screening through a U.S. standard 20 mesh screen and retained on a U.S. standard 100 mesh screen;
 iv. coating the polysaccharide superabsorbent polymer particles with a polyphosphate or polyphosphoric acid as a crosslinking agent
 v. heating the coated polysaccharide superabsorbent polymer particles to affect surface crosslinking of the coated polysaccharide superabsorbent polymer particle surface wherein the level of functional cross links in the vicinity of the surface of the polysaccharide superabsorbent polymer particulate is greater than the level of functional cross links in the interior of the polysaccharide superabsorbent polymer particulate; and
 vi. treating the surface of the dried polysaccharide superabsorbent polymer particles with a post-crosslinking agent selected from a water soluble multivalent metal salt or an acid wherein the water soluble multivalent metal salt includes a metal cation selected from Al, Fe, Zr, Mg, or Zn and the acid is selected from phosphoric acid, acetic acid, lactic acid, citric acid, glyconic acid and gluconic acid wherein the post-crosslinking agent is applied to the surface of the surface crosslinked polysaccharide superabsorbent polymer particulate to form polysaccharide superabsorbent polymer particulate wherein the polysaccharide superabsorbent polymer particulate has a permeability half life of about 30 days or more.

9. The process according to claim 8 wherein the polysaccharide is an uncrosslinked polysaccharide.

10. The process according to claim 8 wherein the polysaccharide is a polycarboxypolysaccharide.

11. The process according to claim 10 wherein the carboxyl groups of the uncrosslinked polycarboxypolysaccharide are neutralized to at least about 50 mol%.

12. The process according to claim 8 wherein the crosslinking or the drying occurs at a temperature from about 70 °C to about 180 °C.

13. The process according to claim 8 wherein the mixing step of the crosslinking agent occurs at a pH within a range from about 8 to about 12.

14. The process according to claim 8 wherein the mixing step of the polysaccharide with the polyphosphate or with the polyphosphoric acid occurs in such a way that initially the polyphosphate is dissolved in water, a pH within a range from about 8 to about 12 is set in the aqueous solution of the polyphosphate, and then the aqueous solution of the polyphosphate is mixed with an uncrosslinked polysaccharide.

15. The process according to claim 8 wherein the crosslinking agent is mixed with the polysaccharide in an amount within a range from about 0.00 1 to about 20 wt.%, based upon the weight of the polysaccharide.

16. The process according to claim 8 wherein the polysaccharide comprises a salt content of less than about 20 wt.%, based upon the total weight of the polysaccharide.

17. The process according to claim 8 wherein the multivalent metal salt includes an anion selected from halides, chlorohydrates, sulfates, nitrates, and acetates.

18. The process according to claim 8 wherein the multivalent metal salt is aluminum sulphate.

19. The process according to claim 8 wherein the multivalent metal salt is a hydrated aluminum sulphate having from about 12 to about 14 waters of hydration.

20. The process according to claim 8 wherein the polyphosphate comprises as crosslinking agent the composition $M^I_{n+2}[P_nO_{3n+1}]$ or $M^I_n[H_2P_nO_{3n+1}]$, wherein $M^I$ is a monovalent metal and n has a value of at least 2.

21. The process according to claim 8 wherein the polyphosphoric acid as crosslinking agent has the composition $H_{n+2}P_nO_{3n+1}$ or $(HPO_3)_n$, in which n has a value of at least 2.

* * * * *

UNITED STATES PATENT AND TRADEMARK OFFICE
CERTIFICATE OF CORRECTION

| | | |
|---|---|---|
| PATENT NO. | : 8,361,926 B2 | Page 1 of 1 |
| APPLICATION NO. | : 12/277637 | |
| DATED | : January 29, 2013 | |
| INVENTOR(S) | : Gonglu Tian et al. | |

It is certified that error appears in the above-identified patent and that said Letters Patent is hereby corrected as shown below:

Column 26,
Line 58, "about 0.00 1 to" should read -- about 0.001 to --.

Signed and Sealed this
Twelfth Day of March, 2013

Teresa Stanek Rea
*Acting Director of the United States Patent and Trademark Office*